US012743152B2

(12) United States Patent
Anderson et al.

(10) Patent No.: US 12,743,152 B2
(45) Date of Patent: Sep. 22, 2026

(54) SYSTEMS, APPARATUS, ARTICLES OF MANUFACTURE, AND METHODS FOR EYE GAZE CORRECTION IN CAMERA IMAGE STREAMS

(71) Applicant: Intel Corporation, Santa Clara, CA (US)

(72) Inventors: Glen J. Anderson, Beaverton, OR (US); Chia-Hung S. Kuo, Folsom, CA (US); Sangeeta Manepalli, Chandler, AZ (US); Passant Karunaratne, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 28 days.

(21) Appl. No.: 17/856,291

(22) Filed: Jul. 1, 2022

(65) Prior Publication Data

US 2022/0334638 A1 Oct. 20, 2022

(51) Int. Cl.

| | |
|---|---|
| ***G06F 3/01*** | (2006.01) |
| ***G06T 13/40*** | (2011.01) |
| ***G06V 40/18*** | (2022.01) |
| ***H04L 12/18*** | (2006.01) |

(52) U.S. Cl.

CPC .............. *G06F 3/013* (2013.01); *G06T 13/40* (2013.01); *G06V 40/193* (2022.01); *H04L 12/1818* (2013.01); *H04L 12/1822* (2013.01); *G06T 2210/12* (2013.01)

(58) Field of Classification Search

CPC .......... G06F 3/013; G06F 3/011; G06F 3/012; G06T 13/40; G06T 2210/12; G06V 40/193; G06V 10/82; G06V 10/98; G06V 20/40; G06V 40/165; G06V 40/19; H04L 12/1818; H04L 12/1822; H04L 12/1827; H04L 51/52; H04N 7/147

See application file for complete search history.

(56) References Cited

U.S. PATENT DOCUMENTS

| | | | |
|---|---|---|---|
| 8,243,116 | B2 | 8/2012 | Qvarfordt et al. |
| 9,400,553 | B2 | 7/2016 | Kerr et al. |
| 9,456,244 | B2 | 9/2016 | Felkai et al. |

(Continued)

OTHER PUBLICATIONS

Wu et al., "Evolution and Human Behavior," ScienceDirect, vol. 35, Issue 3, pp. 211-218, May 2014, 8 pages.

(Continued)

*Primary Examiner* — Abhishek Sarma

(74) *Attorney, Agent, or Firm* — Hanley, Flight & Zimmerman, LLC

(57) ABSTRACT

Systems, apparatus, articles of manufacture, and methods for eye gaze correction in camera image streams are disclosed. An example apparatus disclosed herein includes timing circuitry to calculate a duration of time for which an eye gaze of a first user of a video conference is directed toward a second user of the video conference, the second user presented as an image via a video conference interface, the video conference interface presented by a display of an electronic device, and social feedback control circuitry to select an eye gaze time threshold based on content associated with the video conference interface, and in response to the duration satisfying the eye gaze time threshold, cause an alert to be presented on the display with the video conference interface.

17 Claims, 16 Drawing Sheets

(56) References Cited

U.S. PATENT DOCUMENTS

| | | | | |
|---|---|---|---|---|
| 9,584,766 | B2 | 2/2017 | Pradeep et al. | |
| 10,893,231 | B1 | 1/2021 | Huffman et al. | |
| 11,024,002 | B2 | 6/2021 | Isikdogan et al. | |
| 2009/0079816 | A1* | 3/2009 | Qvarfordt | G06V 40/20 348/14.16 |
| 2013/0120522 | A1* | 5/2013 | Lian | H04N 7/15 348/E7.083 |
| 2022/0057861 | A1 | 2/2022 | Petuchowski | |
| 2022/0126201 | A1* | 4/2022 | Ma | H04L 65/1059 |
| 2022/0141266 | A1 | 5/2022 | Cossar et al. | |
| 2023/0119205 | A1* | 4/2023 | Agrawal | G06T 7/70 348/14.03 |

OTHER PUBLICATIONS

Laidlaw et al., "Potential Social Interactions are Important to Social Attention," PNAS, vol. 108, No. 14, Apr. 5, 2011, 6 pages.

Wohltjen et al., "Eye Contact Marks the Rise and Fall of Shared Attention in Conversation," PNAS, vol. 118, No. 37, 2021, 8 pages.

Hsu et al., "Look at Me! Correcting Eye Gaze in Live Video Communication," ACM Trans. Multimedia Comput. Commun. Appl., vol. 15, No. 2, Article 38, May 2019, 23 pages.

Krafka et al., "Eye Tracking for Everyone," 2016 IEEE Conference on Computer Vision and Pattern Recognition (CVPR), Jun. 27-30, 2016, 9 pages.

Ren et al., "Look, Listen and Learn—A Multimodal LSTM for Speaker Identification," Proceedings of the Thirtieth AAAI Conference on Artificial Intelligence (AAAI-16), 2016, 7 pages.

Binetti et al., "Pupil Dilation as an Index of Preferred Mutual Gaze Duration," Royal Society Open Science, 2016, 11 pages.

Isikdogan et al., "Eye Contact Correction using Deep Neural Networks," ararXiv:1906.05378v2 [cs.CV], Dec. 26, 2019, 9 pages.

European Patent Office, "Extended European Search Report," issued in connection with European Patent Application No. 23175271.8, dated Nov. 8, 2023, 9 pages.

European Patent Office, "Communication pursuant to Article 94(3) EPC," issued in connection with European Patent Application No. 23175271.8, dated Jul. 22, 2025, 5 pages.

* cited by examiner 700, 704, 706, 708

| SCENARIO FOR ALL-RECIPIENT | 1:1 CONFERENCE | 3 OR MORE CONFERENCE |
|---|---|---|
| 710 USER DOES NOT LOOK TOWARD CAMERA (OUT OF RANGE FOR GAZE CORRECTION) | FEEDBACK FOR USER TO LOOK AT OTHER PARTICIPANT AFTER 3 SECONDS | FEEDBACK FOR USER TO LOOK AT OTHER PARTICIPANTS AFTER 5 SECONDS |

| SCENARIO FOR SINGLE-RECIPIENT | 1:1 CONFERENCE | 3 OR MORE CONFERENCE |
|---|---|---|
| 712 USER LOOKS AT PARTICIPANT(S) WHO IS SPEAKING | FEEDBACK FOR USER GIVE A BREAK IN EYE CONTACT AT 4 SECONDS | NO FEEDBACK NEEDED |
| 714 USER LOOKS AWAY FROM PARTICIPANT(S) WHO IS SPEAKING | FEEDBACK FOR USER TO LOOK AT OTHER PARTICIPANT AFTER 3 SECONDS | FEEDBACK FOR USER TO LOOK AT OTHER PARTICIPANTS AFTER 5 SECONDS |
| 716 USER DOES NOT LOOK TOWARD CAMERA (OUT OF RANGE FOR GAZE CORRECTION) | FEEDBACK FOR USER TO LOOK AT OTHER PARTICIPANT AFTER 3 SECONDS | FEEDBACK FOR USER TO LOOK AT OTHER PARTICIPANTS AFTER 5 SECONDS |
| 718 PARTICIPANT PUPIL DILATION RATE GREATER THAN 1 STANDARD DEVIATION FROM MEAN | EXTEND EYE GAZE TIME THRESHOLD BY 20% | EXTEND EYE GAZE TIME THRESHOLD BY 20% |
| 720 USER IS SPEAKING BUT NOT FACING THE DISPLAY | FEEDBACK FOR USER TO LOOK AT OTHER PARTICIPANT AFTER 2 SECONDS | FEEDBACK FOR USER TO LOOK AT OTHER PARTICIPANTS AFTER 2 SECONDS |

FIG. 7B

SYSTEMS, APPARATUS, ARTICLES OF MANUFACTURE, AND METHODS FOR EYE GAZE CORRECTION IN CAMERA IMAGE STREAMS

FIELD OF THE DISCLOSURE

This disclosure relates generally to video processing and, more particularly, to systems, apparatus, articles of manufacture, and methods for eye gaze correction in camera image streams.

BACKGROUND

During a video conference, a camera of an electronic device captures images of a user. A video stream (e.g., a camera image stream) including the images of the user is output for presentation by electronic device(s) associated with other participant(s) in the video conference.

BRIEF DESCRIPTION OF THE DRAWINGS

FIGS. 7A and 7B are tables including example rules utilized by the gaze management circuitry of FIG. 3 to manage eye gaze of a user.

In general, the same reference numbers will be used throughout the drawing(s) and accompanying written description to refer to the same or like parts. The figures are not to scale.

Figure 1:
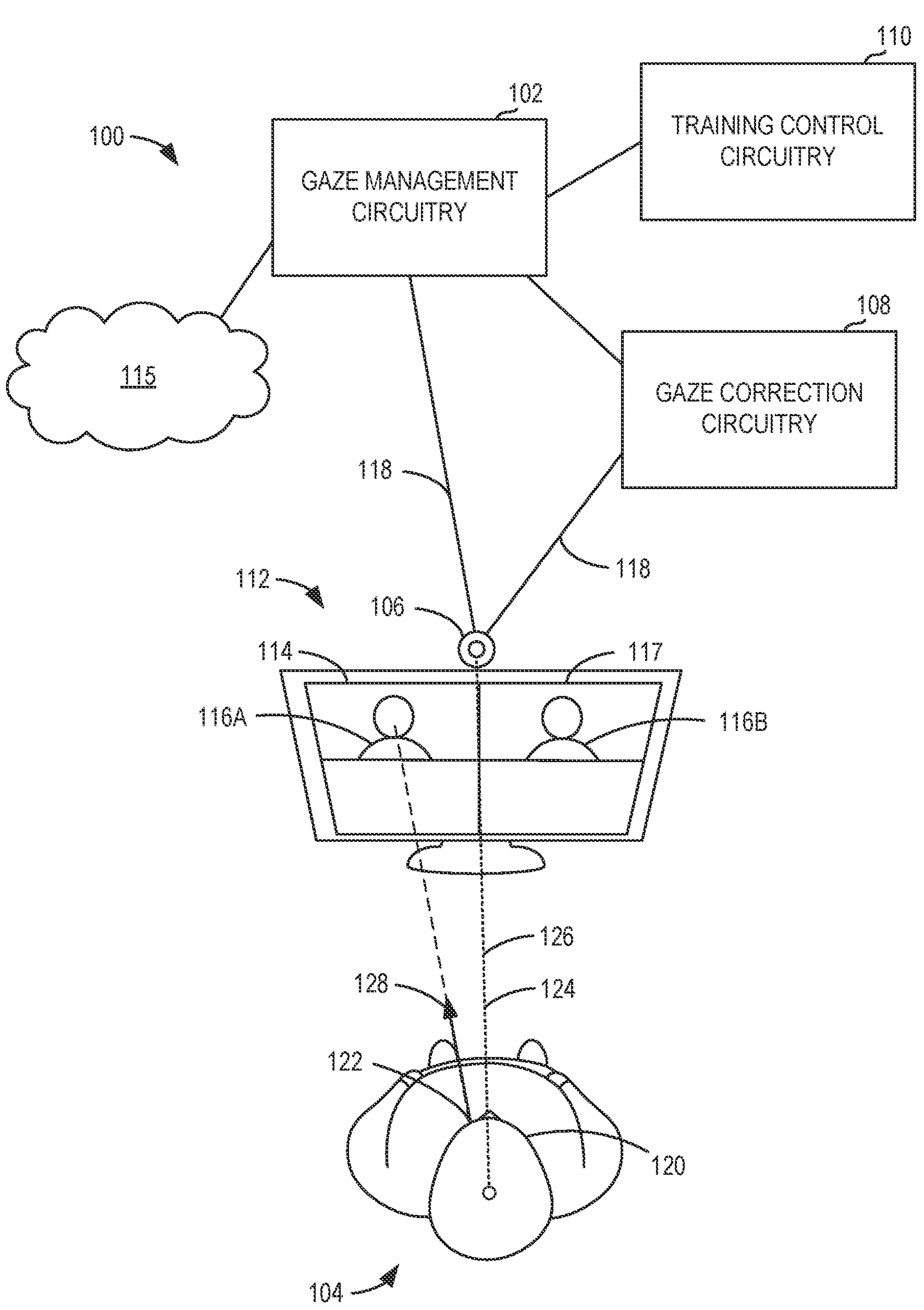
FIG. 1 illustrates an example system including an example electronic user device and example gaze management circuitry to facilitate adjustments to an eye gaze of a user relative to one or more participants in a video conference in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

An electronic user device (also referred to herein as a device or a user device) such as a laptop, a tablet, or a smartphone can include a camera to capture images and/or videos of a user of the device and/or of an environment in which the device is located. The user device can include user applications such as a video conferencing application installed thereon. During a video conference, images of the user and/or the environment are captured via the camera of the user device and are output for presentation at electronic device(s) associated with other participant(s) of the video conference.

During a video conference, a direction of the user's eye gaze changes relative to the camera, which affects the perception of eye contact with other participants in the video conference. For instance, when a user's eye gaze is directed toward the camera, the camera captures images of the user that, when output for presentation to the other participant(s) of the video conference, create an illusion of eye contact between the user and the other participant(s). Such simulated eye contact can substantially mirror in-person social interactions to improve a conversational experience of the other participant(s) in the video conference. However, the user's eye gaze may be directed away from the camera when, for instance, the user is looking at a document or at images of the other participant(s) presented on a display screen of the user device. As a result, the other participant(s) in the video conference may view, for instance, a side profile of the user's face and/or experience a lack of eye contact while the user's gaze is directed away from the camera, which can result in an unnatural conversational experience.

In some cases, gaze correction techniques can be applied to images of the user to simulate eye contact with the other participant(s) when the user's gaze is directed away from the camera. For instance, the gaze correction techniques warp the user's eyes in the images so that the user appears to be gazing towards the camera and, thus, appears to be making eye contact with the other participant(s). However, such known gaze correction techniques do not account for eye movements that typically occur during, for instance, in-person conversations, such as blinking, brief glances away from the speaker, etc. Rather, known gaze correction techniques do not dynamically adjust the eye gaze and, as a result, give the appearance of sustained eye contact for extended periods of time that may be unnerving and/or unnatural to the other participant(s). Moreover, some gaze correction techniques are applied when the user does not intend to make eye contact with the other participant(s), such as when the user is looking at a document presented on the display screen. Thus, when adjusting a user's eye gaze during a video call, known eye gaze correction techniques do not account for expected eye movements (e.g., blinking, changes in eye direction) that typically characterize in-person interactions.

Disclosed herein are example systems, apparatus, and methods that evaluate an eye gaze of a user of a video conference to improve conversational experiences with respect to eye gaze behavior between participants in a video conference. Examples disclosed herein detect a direction of eye gaze of a user (e.g., a first participant of the video conference) in video frames captured by a camera. Some examples disclosed herein determine a first portion of a graphical user interface (GUI) associated with a video conferencing application toward which the eye gaze of the user/first participant is directed. In some examples, the first portion of the graphical user interface includes an image of a second participant of the video conference. Examples disclosed herein obtain and/or generate gaze corrected frames in which images of the eyes of the user are adjusted (e.g., warped) to cause the user's gaze to appear to be directed toward the camera. Examples disclosed herein cause the gaze corrected frames to be transmitted for presentation to a second participant of the video conference to simulate eye contact between the first and second participants.

Some examples disclosed herein calculate a duration for which the user's eye gaze (e.g., the corrected eye gaze) is directed toward the first portion of the graphical user interface and, thus, the second participant of the video conference. Examples disclosed herein compare the duration to a threshold (e.g., an eye gaze time threshold). The eye gaze time threshold can be based on at least one of a heuristic model or a neural network model generated based on social feedback reference data, where the social feedback reference data includes, for instance, a number of participants in the video conference, a pupil dilation rate of the other participant(s) (which can serve as an indication whether the other participant(s) prefer extended periods of eye contact), etc. In some examples, when the duration of time that the corrected eye gaze of the first participant satisfies (e.g., exceeds) the threshold, examples disclosed herein causes an alert to be presented on a display screen of a user device. The alert can serve as an indicator or suggestion that the user switch his or her eye gaze to a second portion of the video conference interface different from the first portion. For example, the alert can include at least one or a visual indication or an audio indication recommending that the user direct their eye gaze toward or away from a particular participant of the video conference (e.g., the image of the second participant on the first portion of the GUI). Thus, examples disclosed herein can reduce instances in which a user maintains or avoids eye contact with particular participants of the video conference for extended durations, thereby improving interactions between video conference participants in a manner that can substantially replicate in-person interactions.

Some examples disclosed herein identify a participant who is speaking during the video conference (i.e., a participant different than the first participant above). Examples disclosed herein determine if the eye gaze (e.g., the corrected eye gaze) of the user/first participant is directed to the speaker. If the eye gaze of the user is not directed to the speaker because, for instance, the user is looking away from the display screen, examples disclosed herein can cause alert(s) (e.g., visual alerts, audio alerts) to be presented to indicate that the user should direct their gaze toward the camera. Thus, examples disclosed herein provide for increased perception of engagement with participants of a video conference.

Although examples disclosed herein are discussed in connection with the video streams, examples disclosed herein could additionally or alternatively be used in connection with other types of image data, such as still images. In some examples, the video streams and/or the image data correspond to images of a user of a user device. Additionally or alternatively, examples disclosed herein could be applied to images of an avatar representing the user (e.g., to prevent an impression that the avatar is unnaturally staring at another participant in the video conference without blinking and/or without changing its eye direction after blinking).

FIG. 1 illustrates an example system 100 including example gaze management circuitry 102 to facilitate adjustments to an eye gaze of a user 104 during a video conference in accordance with teachings of this disclosure. In the illustrated example of FIG. 1, the gaze management circuitry 102 is communicatively coupled to an example camera (e.g., a video camera) 106 to obtain image data (e.g., video stream data) captured by the camera 106. The system 100 can include one or more cameras 106. In the example of FIG. 1, the gaze management circuitry 102 is communicatively coupled to example gaze correction circuitry 108. In this example, the gaze management circuitry 102, and the gaze correction circuitry 108 are implemented by an example device (e.g., electronic device, user device) 112. In some examples, one or more of the gaze management circuitry 102 or the gaze correction circuitry 108 may be implemented by one or more example cloud-based devices 115 and/or other user devices (e.g., a smartphone). Also, as shown in FIG. 1, the gaze management circuitry 102 is communicatively coupled to training control circuitry 110. The training control circuitry 110 generates one or more machine learning models for use by the gaze management circuitry 102. The training control circuitry 110 may be implemented by one or more of the cloud-based devices 115, the device 112, another user device, etc.

The device 112 of FIG. 1 can include, for instance, personal computing device such as a desktop computer. The device 112 can include other types of user devices, such as a laptop, a smartphone, an electronic tablet, etc. In some examples, the device 112 is a virtual reality device, an augmented reality device, a mixed reality device, etc. The device 112 includes a display 114 (e.g., a display screen). In some examples, the camera 106 is a built-in camera of the device 112. In some examples, the camera 106 is an accessory that can be coupled to (e.g., mounted to) the device 112. In the example of FIG. 1, the camera 106 is a video camera.

As shown in FIG. 1, the user 104 interacts with the device 112 during a video conference. In the example of FIG. 1, the device 112 includes a video conferencing application installed thereon. During the video conference, a video conference interface 117 (i.e., a graphical user interface (GUI)) of the video conferencing application is presented to the user 104 via the display 114. In particular, the video conference interface 117 includes video streams from other participants 116A, 116B of the video conference presented on the display 114. Further, during the video conference, the camera 106 of the device 112 generates image data (e.g., video frame(s)) of the user 104, where the image data defines an example video stream signal 118.

Although examples disclosed herein are discussed in connection with the video stream signal 118, examples disclosed herein could additionally or alternatively be used in connection with other types of image data, such as still images. In some examples, the image data can include images and/or video frames of an avatar representing the user 104 (e.g., instead of captured images of the user 104). The avatar representing the user 104 can be generated by the video conferencing application. In some examples, the avatar in the avatar images can have an eye gaze based on the eye gaze of the user 104. In some examples, the eye gaze of the avatar is independent of the eye gaze of the user 104. In such examples, the sample rules disclosed herein for adjusting eye gaze of the user 104 can be applied to the eye gaze of the avatar.

In the illustrated example of FIG. 1, the video stream signal 118 (e.g., the raw image data) is processed by the gaze correction circuitry 108 and, in some examples, the gaze management circuitry 102. In this example, the gaze management circuitry 102 and/or the gaze correction circuitry 108 are implemented by executable instructions executed on processor circuitry of the device 112. In some examples, at least one of the gaze management circuitry 102 or the gaze correction circuitry 108 is implemented by processor circuitry of another user device such as a wearable device. In some examples at least one of the gaze management circuitry 102 or the gaze correction circuitry 108 is implemented by one or more of the cloud-based device(s) 115 (e.g., one or more server(s), processor(s), and/or virtual machine(s)). In some examples, at least one of the gaze management circuitry 102 or the gaze correction circuitry 108 is implemented by dedicated circuitry located on the device 112. These components may be implemented in software, hardware, or in any combination of two or more of software, firmware, and/or hardware.

In the example of FIG. 1, the gaze correction circuitry 108 analyzes image data of the video stream signal 118 to detect a face 120 and/or eye(s) 122 of the user 104 in the image data. For example, the gaze correction circuitry 108 executes one or more neural network models (e.g., face detection neural network model(s)) to detect the face 120 of the user 104 in each of the video frames associated with the video stream signal 118. In some examples, the gaze correction circuitry 108 determines an orientation (e.g., a yaw angle, a pitch angle, and/or a roll angle) of the face 120 of the user 104 with respect to the camera 106 based on the image data. The gaze correction circuitry 108 executes neural network model(s) (e.g., face orientation neural network model(s) generated via neural network training) to predict an angle at which a facial feature (e.g., an eye) of the user 104 is disposed relative to the camera 106 based on the image data from the video stream signals 118.

As a result of execution of the neural network model(s), the gaze correction circuitry 108 determines an example yaw angle 124, which for illustrative purposes, is represented in FIG. 1 as an angle between, for example, a nose of the user 104 and an example camera axis 126 extending between the user 104 and the camera 106. In this example, as a result of the execution of the neural network model(s), the gaze correction circuitry 108 determines that the user 104 is facing substantially straight ahead such that the yaw angle 124 is defined as 0 degrees (e.g., within ±1 degree). In some examples, the gaze correction circuitry 108 compares the yaw angle 124 to a yaw angle threshold. The yaw angle threshold can indicate that, for instance, a yaw angle between 0≤±30 degrees is indicative of the face 120 of the user 104 being oriented toward the camera 106 (e.g., a camera plane associated with the cameras 106 onto which the face 120 of the user 104 is projected).

In the example of FIG. 1, the gaze correction circuitry 108 executes one or more neural network models (e.g., eye detection neural network model(s)) to detect the eye(s) 122 of the user 104 in each of the video frames. In particular, based on the neural network model(s), the gaze correction circuitry 108 predicts whether the eye(s) 122 of the user 104 are directed or substantially directed toward the camera 106 or whether the eye(s) 122 of the user 104 are directed elsewhere, such as on the display 114, away from camera 106 and the display 114, etc. In some examples, the gaze correction circuitry 108 determines (e.g., estimates, predicts) the direction of the eye gaze based on the angle (e.g., yaw angle) of the user's face relative to the camera 106.

In examples in which the gaze correction circuitry 108 identifies video frame(s) of the video stream signal 118 in which the eye(s) 122 of the user 104 are not directed toward the camera 106, the gaze correction circuitry 108 executes one or more gaze correction algorithms to adjust or correct the eye gaze in the video frame. In particular, the gaze correction circuitry 108 adjusts or corrects a direction of the eye gaze of the user 104 in the identified video frames such that the user 104 appears to be looking into the camera 106 in each of those video frames. For example, the gaze correction circuitry 108 generates video frames in which the gaze of the user 104 appear to be centered in the images rather than at angle relative to the camera 106 (e.g., a downward angle). The gaze correction circuitry 108 outputs the gaze corrected frames having the modified eye gaze of the user 104 for transmission to the participants of the video conference.

The gaze correction circuitry 108 outputs the gaze corrected frames for transmission to user devices of one or more of the participants 116A, 116B of the video conference for presentation via a video conference interface at the participant user devices. In some examples, the gaze correction circuitry 108 outputs the gaze corrected frames to all of the participants 116A, 116B of the video conference. In such examples, each of the participants 116A, 116B has the impression that the user 104 is looking at (e.g., directly at) the participant 116A, 116B. As disclosed herein, in some examples, the gaze correction circuitry 108 outputs the gaze corrected frames to one of the participants 116A, 116B based on instructions from the gaze management circuitry 102 indicating that the user 104 is looking at a particular participant 116A, 116B.

In some examples, the gaze correction circuitry 108 receives image data from two or more cameras 106. In some examples, the cameras 106 may be associated with different electronic devices (e.g., the personal computing device 112 and a smartphone) and/or different display devices (e.g., two display monitors). The cameras 106 can generate video frames including images of the user 104 from different distances and/or angles. In some examples, the gaze correction circuitry 108 determines the direction of eye gaze of the user 104 in respective ones of the video frames generated by each camera 106. In some examples, the gaze correction circuitry 108 selects the video frames generated by a particular camera 106 for which eye gaze is to corrected based on the direction of eye gaze of the user 104 in the respective video frames. For example, the gaze correction circuitry 108 can select the video frames generated by a particular camera 106 in which the direction of eye gaze of the user 104 is most closely oriented toward the respective camera, such that the selected video frames require the lowest angle of correction to modify the eye gaze of the user 104 in the corresponding gaze corrected frames 214. In such examples, the gaze correction circuitry 108 generates the gaze corrected frames 214 based on the selected video frames from the respective camera(s). In the example of FIG. 1, the gaze correction circuitry 108 provides the gaze corrected video frame(s) to the gaze management circuitry 102. The gaze management circuitry 102 analyzes the video frames from the video stream signal 118 and/or the gaze corrected frames generated by the gaze correction circuitry 108 to provide feedback (e.g., alerts, instructions) to the user 104 with respect to eye gaze behavior during the video conference.

In some examples, the gaze management circuitry 102 detects a direction of eye gaze of the user 104 (e.g., as represented by arrow 128 in FIG. 1) by determining an orientation (e.g., a yaw angle and/or a pitch angle) of the eye(s) 122 of the user 104 in the video frames of the video stream signal 118 relative to the camera 106. In some examples, the gaze management circuitry 102 executes one or more eye gaze detection models (e.g., eye gaze neural network model(s)) based on the video frames to determine the orientation of the eye(s) 122 of the user 104. In some examples, the gaze management circuitry 102 receives face and/or eye gaze orientation information from the gaze correction circuitry 108 (e.g., based on the analysis performed by the gaze correction circuitry 108 in identifying the user's faces and/or eyes to correct the eye gaze). Based on the orientation and position of the eye(s) of the user 104 relative to the camera 106, the gaze management circuitry 102 detects the direction of eye gaze of the user 104 relative to the display 114 and, thus, in some examples, the video conference interface 117 presented thereon. For example, the gaze management circuitry 102 determines whether the user 104 is looking at a particular portion of the video conference interface 117 or away from the video conference interface presented on the display 114.

In some examples, in response to determining that the eye gaze of the user 104 is directed away from the camera 106 and toward the display 114, the gaze management circuitry 102 identifies content on the display 114 that the user 104 is viewing. The gaze management circuitry 102 analyzes display frames presented on the display 114 and/or video conference frames associated with the video conference interface 117 presented on the display 114. The gaze management circuitry 102 identifies content in the portion of the display screen being viewed by the user (e.g., the portion of the video conference interface 117). The display frames can be retrieved from, for instance, display control circuitry (e.g., a graphical processing unit) of the device 112. The gaze management circuitry 102 analyzes the display frames and/or video conference frames that are time-synchronized with the frames of the video stream signal 118 to determine the content in the portion of the display 114 and, in particular, the portion of the video conference interface 117 to which the gaze of the user 104 is directed.

As illustrated in FIG. 1, the eye gaze of the user 104 is directed toward a portion of the video conference interface 117 corresponding to a video stream from a participant user device capturing images of the first participant 116A during the video conference. Thus, in this example, the gaze management circuitry 102 determines that the user 104 is looking at the first participant 116A based on the determined angle of the user's eyes. In this example, the gaze management circuitry 102 instructs the gaze correction circuitry 108 to output the gaze corrected frames for transmission to the participant user device associated with the first participant 116A. As a result, when the gaze corrected frames are output for presentation by the participant user device associated with the first participant 116A, the user 104 appears to the first participant 116A to be making eye contact therewith.

In some examples, based on the analysis of the user's gaze relative to the display frames, the gaze management circuitry 102 determines that the user is looking at a document on the display 114. In such examples, the gaze management circuitry 102 can instruct the gaze correction circuitry 108 to refrain from outputting the gaze corrected frames and, instead, to output the unmodified frames of the video stream signal 118 (i.e., the original frames in which the user's gaze is not directed at the camera 106). Thus, because the user 104 is detected as viewing a document on the display 114, the gaze management circuitry 102 determines that the user 104 does not intend to make eye contact with any of the participants 116A, 116B of the video conference. Thus, the gaze management circuitry 102 controls the output of the gaze corrected frames to prevent the user 104 from appearing to look at one or more of the participants 116A, 116B while reading the document.

Although examples disclosed herein discuss the gaze tracking as performed by the gaze management circuitry 102, in some examples, the tracking of the user's gaze relative to the display 114 could additionally or alternatively be performed by the gaze correction circuitry 108.

In some examples, the user 104 may be looking at, for instance, the first participant 116A on the video conference interface 117 for a duration of time (e.g., more than 5 seconds, more than 10 seconds, etc.). As a result, the gaze corrected frames generated by the gaze correction circuitry 108 can give the appearance that the user is staring at the first participant 116A, which may result in social discomfort for one or more of the participants 116A, 116B. Conversely, lack of eye contact between the user 104 and one or more of the participant(s) 116A, 116B during the video conference may result in an unnatural conversational experience, particularly if one of the participants 116A, 116B is speaking. In the example of FIG. 1, the gaze management circuitry 102 monitors the gaze corrected frames over time and provides feedback (e.g., visual and/or audio alerts) to the user 104 indicative of behavioral trends with respect to the user's eye gaze. For instance, the gaze management circuitry 102 can provide feedback with respect to a duration of time that the user's gaze (i.e., the corrected gaze) has been directed to one of the participants 116A, 116B of the video conference. In some examples, the gaze management circuitry 102 determines which of the participants 116A, 116B is speaking at a given time. The gaze management circuitry 102 can generate alerts and/or recommendations suggesting that the user 104 direct his or her eye gaze toward the speaker (e.g., the second participant 116B) if the gaze management circuitry 102 determines that gaze corrected frames present the eye gaze of the user 104 as directed to the non-speaking participant (e.g., the first participant 116A).

In some examples, the gaze management circuitry 102 monitors durations for which the eye gaze of the user 104 is directed away from the display 114 and/or toward particular portions of the video conference interface 117. In some examples, the gaze management circuitry 102 monitors one or more additional parameters associated with the video conference, including a number of the participants 116A, 116B participating in the video conference, pupil dilation rate(s) of the participant(s) 116A, 116B, whether one or more of the participants 116A, 116B are speaking, and/or whether one or more of the participants 116, 116B are looking at the user 104 (e.g., based on snapshots of the video conference interface 117). In some examples, the gaze management circuitry 102 selects an eye gaze time threshold based on content associated with the portion of the video conference interface 117 toward which the eye gaze (i.e., the corrected eye gaze) of the user 104 is directed and/or based on one or more of the additional parameters. In some examples, the eye gaze time threshold is based on reference data derived from studies of social interactions and/or interpersonal communications. For example, the reference data can include average amounts of time for which eye contact is maintained during an in-person conversation between two people, average amounts of time for which eye contact is maintained between members in a group of three or more people, etc. In some examples, the gaze management circuitry 102 selects the eye gaze time threshold based on one or more heuristic (e.g., rule-based) models and/or one or more machine learning models generated based on social interaction reference data. As disclosed in connection with FIG. 4, the machine learning model(s) are generated as a result of neural network training performed by the training control circuitry 110.

In the example of FIG. 1, the gaze management circuitry 102 monitors the duration that the eye gaze in the gaze corrected frame(s) are associated with the particular portion of the video conference interface 117, and compares the duration to the eye gaze time threshold. In some examples, in response to determining that the duration satisfies (e.g., exceeds) the eye gaze time threshold, the gaze management circuitry 102 causes one or more alerts to be presented to the user 104 via the device 112. For example, the alert(s) can include visual and/or audio notifications that suggest that the user 104 to direct his or her eye gaze away from the particular portion of the video conference interface 117 (corresponding to one of the participants 116A, 116B) and/or toward a different portion of the video conference interface 117 (corresponding to a different one of the participants 116A, 116B).

Figure 2:
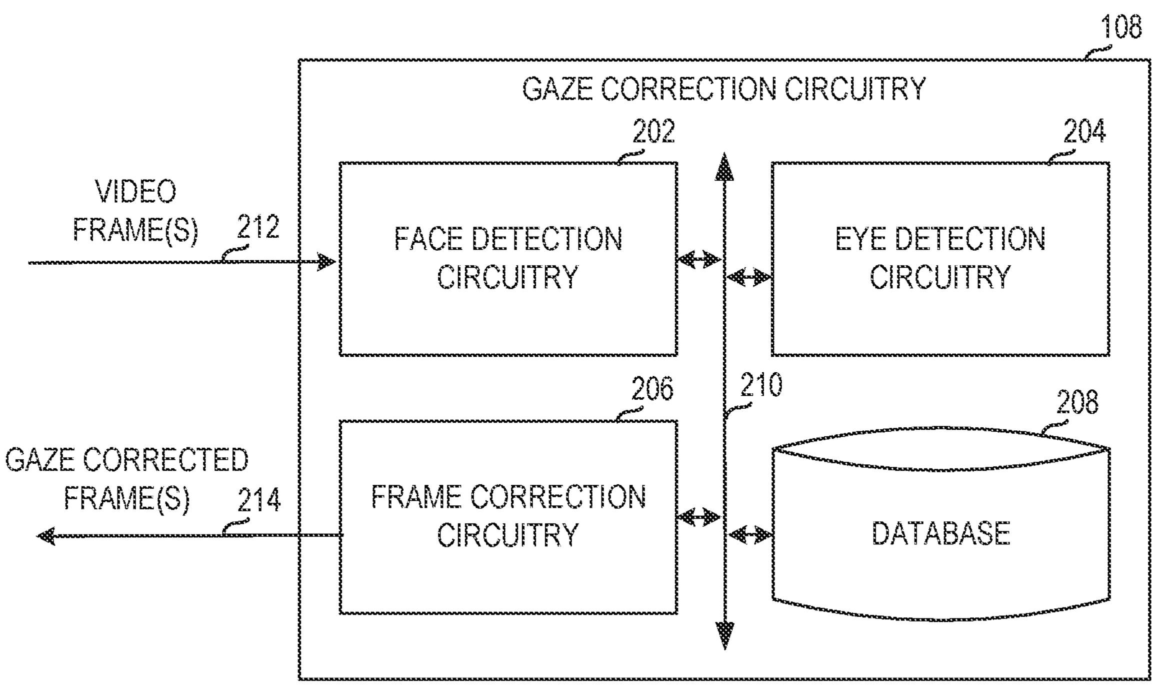
FIG. 2 is a block diagram of the example gaze correction circuitry of FIG. 1.

FIG. 2 is a block diagram of the example gaze correction circuitry 108 of FIG. 1. The gaze correction circuitry 108 of FIG. 2 may be instantiated (e.g., creating an instance of, bring into being for any length of time, materialize, implement, etc.) by processor circuitry such as a central processing unit executing instructions. Additionally or alternatively, the gaze correction circuitry 108 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example of FIG. 2, the gaze correction circuitry 108 includes example face detection circuitry 202, example eye detection circuitry 204, example frame correction circuitry 206, and an example database 208. In the illustrated example of FIG. 2, any of the face detection circuitry 202, the eye detection circuitry 204, the frame correction circuitry 206, and/or the database 208 can communicate via an example communication bus 210. In examples disclosed herein, the communication bus 210 may be implemented using any suitable wired and/or wireless communication. In additional or alternative examples, the communication bus 210 includes software, machine readable instructions, and/or communication protocols by which information is communicated among the face detection circuitry 202, the eye detection circuitry 204, and/or the frame correction circuitry 206.

The example face detection circuitry 202 is communicatively coupled to the device 112 of FIG. 1 to receive and/or otherwise obtain video frame(s) 212 from the video stream signal 118 generated by the camera 106 of the device 112. In some examples, the face detection circuitry 202 provides the video frame(s) 212 to the database 208 for storage therein. The example database 208 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 208 may be in any data format such as, for example, binary data, comma delimited data, tab delimited data, structured query language (SQL) structures, etc. While, in the illustrated example, the example database 208 is illustrated as a single device, the example database 208 and/or any other data storage devices described herein may be implemented by any number and/or type(s) of memories.

In the illustrated example of FIG. 2, the face detection circuitry 202 analyzes the video frame(s) 212 extracted from the video stream signal 118 to detect face(s) (e.g., human face(s)) in the video frame(s) 212. For example, the face detection circuitry 202 can execute one or more neural network models to identify and/or predict locations of the face(s) in the video frames 212. In particular, the example face detection circuitry 202 of FIG. 2 executes one or more face detection model(s) to identify face(s) in the video frame(s) 212 and to output bounding boxes at the predicted location(s) of the face(s) in the video frame(s) 212. Additionally or alternatively, as a result of execution of the face detection model(s), the face detection circuitry 202 identifies a location of a facial feature such as a nose of the user 104 in each of the video frames 212. The facial feature(s) can include other portions of the face of the user 104 such as the chin the nose bridge, etc. In some examples, each of the bounding boxes output by the face detection circuitry 202 corresponds to a detected face and includes the identified facial feature(s). In some examples, the face detection model(s) are preloaded and/or stored in the face detection circuitry 202 and/or in the database 208.

In some examples, the face detection circuitry 202 determines (e.g., estimates, predicts) an orientation of the face of the user 104 in the respective video frames 212 relative to the camera 106 of FIG. 1. The face detection circuitry 202 can determine a yaw angle, a pitch angle, and/or a roll angle of the facial feature(s) (e.g., nose) of the user 104 relative to the camera 106. In some examples, the face detection circuitry 202 executes one or more face orientation estimation model(s) (e.g., face orientation estimation neural network model(s)) to determine a yaw angle, a pitch angle, and/or a roll angle of the particular facial feature(s). For instance, the face detection circuitry 202 determines (e.g., predicts, estimates) the yaw angle 124 of FIG. 1 based on a facial feature (e.g., the nose) identified in a bounding box in the video frames 212 and execution of the orientation estimation model(s). In some examples, the face detection circuitry 202 is instantiated by processor circuitry executing face detection circuitry instructions and/or configured to perform operations such as those represented by the flowchart of FIG. 8.

In the illustrated example of FIG. 2, the eye detection circuitry 204 analyzes the video frame(s) 212 to detect one or more eyes of the detected face(s) in the video frame(s) 212. For example, the eye detection circuitry 204 can execute one or more neural network models to identify and/or predict locations of the eye(s) 122 of the user 104 in the video frames 212. In particular, using the bounding box(es) as input, the example eye detection circuitry 204 of FIG. 2 executes one or more eye detection model(s) (e.g., eye detection neural network model(s)) to identify the locations of the eye(s) in the video frame(s) 212.

The example eye detection circuitry 204 can determine an orientation (e.g., a yaw angle, a pitch angle, and/or a roll angle) of the eye(s) 122 of the user 104 relative to the camera 106 of FIG. 1. For example, the eye detection circuitry 204 receives and/or otherwise obtains the bounding boxes generated by the face detection circuitry 202 for each of the video frames 212, where each of the bounding boxes corresponds to a detected face and includes the eye(s) 122 of the user 104. Using the bounding box(es) as input, the eye detection circuitry 204 executes one or more eye orientation model(s). As a result of executing the eye orientation model(s), the eye detection circuitry 204 determines the yaw angle, the pitch angle, and/or the roll angle of the eyes detected in the bounding box(es) for each of the video frames 212. In some examples, the eye detection circuitry 204 is instantiated by processor circuitry executing eye detection circuitry instructions and/or configured to perform operations such as those represented by the flowchart of FIG. 8.

In the illustrated example of FIG. 2, the frame correction circuitry 206 generates gaze corrected frames 214 by modifying eye gaze of the user 104 in corresponding ones of the video frames 212. For example, the frame correction circuitry 206 warps and/or otherwise alters the eyes 122 of the user 104 in the video frames 212 by modifying the orientation of the eyes 122 in the gaze corrected frames 214. In particular, the frame correction circuitry 206 executes a gaze correction algorithm and known image processing techniques to modify the eyes 122 in the gaze corrected frames 214 such that the eye gaze of the user 104 is directed at the camera 106 of FIG. 1. Stated differently, the frame correction circuitry 206 modifies the orientation of the eyes 122 in the gaze corrected frames 214 to make the user 104 appear to be looking at the camera 106. For instance, frame correction circuitry 206 can cause the gaze of the eyes of the user 104 to appear centered relative to the camera 106 rather than appearing to be disposed at an angle.

In some examples, the frame correction circuitry 206 outputs the gaze corrected frames 214 for transmission to each of the participants in the video conference. As a result, each participant of the video conference has the impression that the user 104 is looking at the respective participant. In some examples, the frame correction circuitry 206 outputs the gaze corrected frames 214 for transmission based on a selected frame rate. In some examples, the frame rate is selected based on latency requirements for the video conference to prevent or substantially reduce delays between video frames that may be perceived by the participants.

In some examples, the frame correction circuitry 206 provides the gaze corrected frames 214 to the participant device(s) of one or more selected participants (e.g., the first participant 116A of FIG. 1) of a video conference for presentation via the participant device(s). For example, as disclosed herein, the gaze management circuitry 102 of FIG. 1 can instruct the frame correction circuitry 206 to provide the gaze corrected frames 214 to the participant device(s) of one or more selected participant(s) based on a determination of particular participant(s) that the user 104 is looking at via the video conference interface 117. As a result, when the gaze corrected frames 214 are presented by the participant device(s) of the selected participants, the gaze corrected frames 214 can simulate eye contact between the user 104 and the selected participant(s) 116A, 116B.

Although in the example of FIG. 2, the gaze corrected frames 214 are provided to the participant device(s) of the other participant(s), the frame correction circuitry 206 can additionally or alternatively provide non-corrected frames (e.g., the video frames 212) to the participant device(s). For example, as disclosed herein, if the gaze management circuitry 102 determines that the user 104 is viewing a document on the display 114 rather than a video conference participant, the gaze management circuitry 102 can instruct the frame correction circuitry 206 to output the non-corrected (e.g., raw) frames. Also, in some examples, the gaze corrected frames 214 can instead be generated by circuitry of the participant device(s) upon receipt of the video frames 212 from the device 112 (e.g., by the gaze correction circuitry 108 implemented on the respective participant devices).

In some examples, the frame correction circuitry 206 does not generate the gaze corrected frames 214 if an angle of the user's face relative to the camera 106 exceeds a threshold and/or if the face detection circuitry 202 and/or the eye detection circuitry 204 cannot detect a threshold portion of facial feature(s) of the user in the video frame(s) 212 (e.g., because the user 104 has turned his or her head away from the camera 106). For example, in response to the face detection circuitry 202 determining that the yaw angle 124 of the user 104 relative to the camera 106 exceeds a threshold angle (e.g., 30 degrees, 45 degrees, etc.), the frame correction circuitry 206 does not generate the gaze corrected frames 214. In some examples, the frame correction circuitry 206 does not generate the gaze corrected frames 214 if the face detection circuitry 202 and/or the eye detection circuitry 204 only detects a portion of one eye and one ear of the user 104 in the video frames 212 (e.g., because the user's face is turned to the side). In some examples, the frame correction circuitry 206 does not generate the gaze corrected frames 214 if lighting conditions of an ambient environment in which the user 104 is located include, for instance, low light or dark lighting conditions. The lighting conditions in the ambient environment can affect the images in the video frame(s) 212, such that the face detection circuitry 202 and/or the eye detection circuitry 204 may not be able to detect the facial feature(s) of the user 104 in the video frame(s) 212. In such examples, the frame correction circuitry 206 provides the video frames 212 (e.g., the non-corrected frames) to the participant device(s) of the other participant(s) 116A, 116B for output and/or display thereon. In some examples, when more than one camera 106 is used to generate images of the user 104, if the face detection circuitry 202 and/or the eye detection circuitry 204 cannot detect facial feature(s) (e.g., a threshold portion of the facial feature(s)) of the user in the video frame(s) 212 generated by one of the cameras 106, the frame correction circuitry 206 can determine if the gaze corrected frames 214 can be generated based on video frames generated by another one of the cameras 106. In some examples, the frame correction circuitry 206 is instantiated by processor circuitry executing gaze correction circuitry instructions and/or configured to perform operations such as those represented by the flowchart of FIG. 8.

In some examples, the gaze correction circuitry 108 includes means for detecting faces. For example, the means for detecting faces may be implemented by the face detection circuitry 202. In some examples, the face detection circuitry 202 may be instantiated by processor circuitry such as the example processor circuitry 1112 of FIG. 11. For instance, the face detection circuitry 202 may be instantiated by the example microprocessor 1400 of FIG. 14 executing machine executable instructions such as those implemented by at least blocks 802, 804 of FIG. 8. In some examples, the face detection circuitry 202 may be instantiated by hardware logic circuitry, which may be implemented by an ASIC, XPU, or the FPGA circuitry 1500 of FIG. 15 structured to perform operations corresponding to the machine readable instructions. Additionally or alternatively, the face detection circuitry 202 may be instantiated by any other combination of hardware, software, and/or firmware. For example, the face detection circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze correction circuitry 108 includes means for detecting eyes. For example, the means for detecting eyes may be implemented by the eye detection circuitry 204. In some examples, the eye detection circuitry 204 may be instantiated by processor circuitry such as the example processor circuitry 1112 of FIG. 11. For instance, the eye detection circuitry 204 may be instantiated by the example microprocessor 1400 of FIG. 14 executing machine executable instructions such as those implemented by at least block 806 of FIG. 8. In some examples, the eye detection circuitry 204 may be instantiated by hardware logic circuitry, which may be implemented by an ASIC, XPU, or the FPGA circuitry 1500 of FIG. 15 structured to perform operations corresponding to the machine readable instructions. Additionally or alternatively, the eye detection circuitry 204 may be instantiated by any other combination of hardware, software, and/or firmware. For example, the eye detection circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze correction circuitry 108 includes means for correcting frames. For example, the means for correcting frames may be implemented by the frame correction circuitry 206. In some examples, the frame correction circuitry 206 may be instantiated by processor circuitry such as the example processor circuitry 1112 of FIG. 11. For instance, the frame correction circuitry 206 may be instantiated by the example microprocessor 1400 of FIG. 14 executing machine executable instructions such as those implemented by at least blocks 808, 810 of FIG. 8. In some examples, the frame correction circuitry 206 may be instantiated by hardware logic circuitry, which may be implemented by an ASIC, XPU, or the FPGA circuitry 1500 of FIG. 15 structured to perform operations corresponding to the machine readable instructions. Additionally or alternatively, the frame correction circuitry 206 may be instantiated by any other combination of hardware, software, and/or firmware. For example, the frame correction circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the gaze correction circuitry 108 of FIG. 1 is illustrated in FIG. 2, one or more of the elements, processes, and/or devices illustrated in FIG. 2 may be combined, divided, re-arranged, omitted, eliminated, and/or implemented in any other way. Further, the example face detection circuitry 202, the example eye detection circuitry 204, the example frame correction circuitry 206, the example database 208, and/or, more generally, the example gaze correction circuitry 108 of FIG. 2, may be implemented by hardware alone or by hardware in combination with software and/or firmware. Thus, for example, any of the example face detection circuitry 202, the example eye detection circuitry 204, the example frame correction circuitry 206, the example database 208, and/or, more generally, the example gaze correction circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example gaze correction circuitry 108 of FIG. 1 may include one or more elements, processes, and/or devices in addition to, or instead of, those illustrated in FIG. 2, and/or may include more than one of any or all of the illustrated elements, processes and devices.

Figure 3:
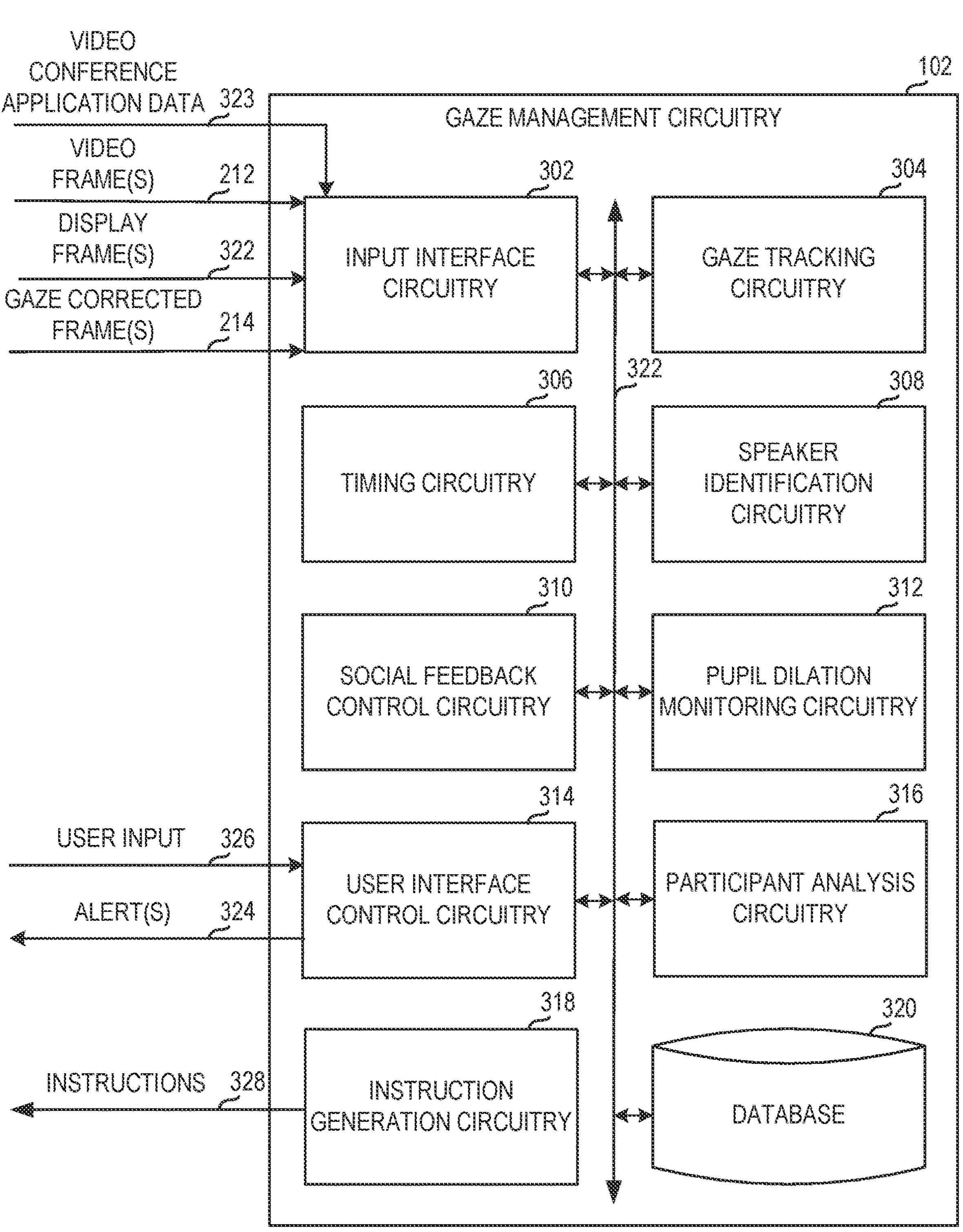
FIG. 3 is a block diagram of the example gaze management circuitry of FIG.

FIG. 3 is a block diagram of the example gaze management circuitry 102 of FIG. 1 to evaluate eye gaze of the user 104 of FIG. 1 and to provide feedback or guidance to the user with respect to eye gaze behavior. The gaze management circuitry 102 of FIG. 3 may be instantiated (e.g., creating an instance of, bring into being for any length of time, materialize, implement, etc.) by processor circuitry such as a central processing unit executing instructions. Additionally or alternatively, the gaze management circuitry 102 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

In the illustrated example of FIG. 3, the gaze management circuitry 102 includes example input interface circuitry 302, example gaze tracking circuitry 304, example timing circuitry 306, example speaker identification circuitry 308, example social feedback control circuitry 310, example pupil dilation monitoring circuitry 312, example user interface control circuitry 314, example participant analysis circuitry 316, example instruction generation circuitry 318, and an example database 320. In the illustrated example of FIG. 2, any of the input interface circuitry 302, the gaze tracking circuitry 304, the timing circuitry 306, the speaker identification circuitry 308, the social feedback control circuitry 310, the pupil dilation monitoring circuitry 312, the user interface control circuitry 314, the participant analysis circuitry 316, the instruction generation circuitry 318, and/or the database 320 can communicate via an example communication bus 321. In examples disclosed herein, the communication bus 321 may be implemented using any suitable wired and/or wireless communication. In additional or alternative examples, the communication bus 321 includes software, machine readable instructions, and/or communication protocols by which information is communicated among the input interface circuitry 302, the gaze tracking circuitry 304, the timing circuitry 306, the speaker identification circuitry 308, the social feedback control circuitry 310, the pupil dilation monitoring circuitry 312, the user interface control circuitry 314, the participant analysis circuitry 316, the instruction generation circuitry 318, and/or the database 320.

The example input interface circuitry 302 is communicatively coupled to the device 112 of FIG. 1 to receive and/or otherwise obtain the video frames 212 extracted from the video stream signal 118 output by the camera 106. In some examples, the input interface circuitry 302 receives display frames 322 from the device 112. In this example, the display frame(s) 322 correspond to snapshots of the content presented on the display 114 at a given time. The display frames 322 can include images of the video conference interface 117 that are presented on the display 114 during the video conference. As discussed herein (FIG. 1), different portions of the video conference interface 117 includes images corresponding to video streams associated with different ones of the participants 116A, 116B participating in the video conference. The display frames 322 can be obtained from, for instance, display control circuitry (e.g., a GPU) of the device 112.

In some examples, the input interface circuitry 302 receives video conference application data 323 from the video conference application installed on the device 112. The video conference application data 323 can include, for example, snapshots of the video conference interface (e.g., in addition to or as an alternative to the images of the video conference interface captured in the display frames 322). In some examples, the video conference application data includes video frames that are extracted from the video streams received by the video conference application installed on the device 112 from the other participant devices during the video conference.

Also, the input interface circuitry 302 receives and/or otherwise obtains the gaze corrected frame(s) 214 from the gaze correction circuitry 108. In some examples, the input interface circuitry 302 is instantiated by processor circuitry executing input interface circuitry instructions and/or configured to perform operations such as those represented by the flowchart of FIG. 9.

In some examples, the input interface circuitry 302 provides the video frame(s) 212, the display frame(s) 322, the video conference application data 323, and/or the gaze corrected frames 214 to the database 320 for storage therein. The example database 320 of FIG. 3 is implemented by any memory, storage device and/or storage disc for storing data such as, for example, flash memory, magnetic media, optical media, solid state memory, hard drive(s), thumb drive(s), etc. Furthermore, the data stored in the example database 320 may be in any data format such as, for example, binary data, comma delimited data, tab delimited data, structured query language (SQL) structures, etc. While, in the illustrated example, the example database 320 is illustrated as a single device, the example database 320 and/or any other data storage devices described herein may be implemented by any number and/or type(s) of memories.

In the illustrated example of FIG. 3, the gaze tracking circuitry 304 detects a direction of the eye gaze of the user 104 and/or a portion of the display 114 toward which the eye gaze of the user 104 is directed. For example, the gaze tracking circuitry 304 determines, based on an orientation of the eyes 122 of the user 104 in the video frames 212, a portion of the video conference interface 117 presented on the display 114 toward which the eye gaze of the user 104 is directed. In some examples, based on the orientation of the eyes 122 of the user 104, the gaze tracking circuitry 304 determines that the eye gaze of the user 104 is directed away from the video conference interface 117 and/or away from the display 114 of the device 112. In some examples, the gaze tracking circuitry 304 obtains the orientation of the eyes 122 from the eye detection circuitry 204 and/or the orientation of the face 120 from the face detection circuitry 202 of the example gaze correction circuitry 108 of FIG. 2. In some examples, the gaze tracking circuitry 304 determines the orientation of the eyes 122 and/or the face 120 by executing, based on the video frame(s) 212, one or more neural network models (e.g., the eye detection neural network models) that are stored in the database 320 and/or another location accessible to the gaze tracking circuitry 304.

In some examples, the gaze tracking circuitry 304 analyzes the display frame(s) 322 and/or the video conference application data 323 (e.g., snapshots of the video conference interface 117) to detect and/or identify content included therein. For instance, the gaze tracking circuitry 304 identifies the content (e.g., face(s) and/or eye(s) of other participant(s)) represented in corresponding portions of the video conference interface included in the display frames 322. The gaze tracking circuitry 304 can identify other content presented on the display 114 in connection with the video conference interface 117 or separate therefrom, such as a word processing document, an email, etc. The gaze tracking circuitry 304 can recognize the content in the display frames 322 and/or the video conference application data 323 based on neural network analysis.

In some examples, the gaze tracking circuitry 304 compares the orientation of the eyes 122 of the user 104 in each of the video frames 212 to the corresponding, time-synchronized display frame(s) 322 and/or video conference application data 323 to identify and/or predict the portion of the display 114, and thus, the content presented in the identified portion of the display 114, toward which the user 104 is looking (e.g., which portion of the video conference interface 117 the user 104 is looking, which can correspond to a particular participant 116A, 116B). For example, the gaze tracking circuitry 304 may determine that the user 104 is looking at the face and/or eyes of another one of the participants 116A, 116B in the video conference based on the on the orientation of the user's eyes and/or face and/or the gaze direction and the correlated display frame content. In some examples, the gaze tracking circuitry 304 determines that the user 104 is looking away from the other participant(s) 116A, 116B of the video conference and/or away from the display 114 of the device 112 based on the orientation of the user's eyes and/or face and/or the gaze direction. In some examples, the gaze tracking circuitry 304 is instantiated by processor circuitry executing gaze tracking circuitry instructions and/or configured to perform operations such as those represented by the flowchart of FIG. 9. Additionally or alternatively, in some examples, some or all of the analysis performed by the gaze tracking circuitry 304 is implemented by the gaze correction circuitry 108 of FIGS. 1 and/or 2.

In the illustrated example of FIG. 3, the instruction generation circuitry 318 generates example instructions 328 and provides the instructions 328 to the gaze correction circuitry 108 of FIGS. 1 and/or 2 with respect to outputting the gaze corrected frames. In some examples, the instructions 328 identify one or more of the participants 116A, 116B (i.e., participant device(s)) to which the gaze correction circuitry 108 is to provide the gaze corrected frames 214. In some examples, the instruction generation circuitry 318 selects the participant(s) 116A, 116B corresponding to the portion of the video conference identified by the gaze tracking circuitry 304, and generates the instructions 328 based on the selected participant(s) 116A, 116B.

As disclosed herein, in some examples, the instruction generation circuitry 318 selects the participant(s) 116A, 116B based on the user input 326 obtained via the user interface control circuitry 314. In some examples, the instruction generation circuitry 318 selects the participant(s) 116A, 116B corresponding to the one or more speakers identified by the speaker identification circuitry 308 and/or the one or more participants 116A, 116B identified by the participant analysis circuitry 316 as making eye contact with the user 104.

In some examples, in response to receiving the instructions 328, the gaze correction circuitry 108 of FIGS. 1 and/or 2 provides the gaze corrected frames 214 to the selected participant device(s) of the participant(s) 116A, 116B identified in the instructions 328. In some examples, the instructions 328 instruct the gaze correction circuitry 108 whether to generate the gaze corrected frame(s) 214. For example, the instructions 328 may direct the gaze correction circuitry 108 to not generate the gaze corrected frames 214 when the gaze tracking circuitry 304 determines that the eye gaze of the user 104 is directed away from the display 114 and/or when the gaze correction circuitry 108 is disabled via the user input 326. As disclosed herein, in some examples, the instructions 328 direct the gaze correction circuitry 108 not to generate the gaze corrected frames 214 and/or not provide the gaze corrected frames 214 to selected participant(s) 116A, 116B when the social feedback control circuitry 310 determines that, for instance, the duration of the eye gaze exceeds the eye gaze time threshold. In some examples, the instruction generation circuitry 318 is instantiated by processor circuitry executing instruction generation circuitry instructions and/or configured to perform operations such as those represented by the flowchart of FIG. 9.

In the illustrated example of FIG. 3, the user interface control circuitry 314 obtains example user input 326 provided by the user 104 via the device 112. In some examples, the user input 326 indicates a selection of one or more of the participants 116A, 116B to which the gaze corrected frames 214 of FIG. 2 are to be presented. In some examples, the user 104 can, via the user input 326, disable the gaze correction circuitry 108 to prevent generation of the gaze corrected frames 214. The user input(s) 326 can override instruction(s) 328 generated by the instruction generation circuitry 318. In some examples, the user interface control circuitry 314 is instantiated by processor circuitry executing user interface control circuitry instructions and/or configured to perform operations such as those represented by the flowchart of FIG. 9.

When the gaze corrected frames 214 are output for presentation to the other participant(s) 116A, 116B in the video conference via the corresponding participant device (s), the gaze management circuitry 102 monitors behavior with respect to the user's eye gaze and provides alerts, suggestions, recommendations, indicators, etc. that may enhance the social interactions between participants during the video conference. In the illustrated example of FIG. 3, the timing circuitry 306 monitors a duration (e.g., a time period) for which the eye gaze of the user 104 as provided in the gaze corrected frames 214 is directed toward a particular portion of the video conference interface 117 and, thus, in some instance, a particular participant 116A, 116B. For example, the timing circuitry 306 starts and/or initiates a timer in response to the gaze tracking circuitry 304 determining that the eye gaze of the user 104 is directed toward a first portion of the video conference interface 117, and the timing circuitry 306 monitors the time elapsed until gaze tracking circuitry 304 determines that the user 104 has switched his or her eye gaze to a second portion of the video conference interface 117 at least partially different from the first portion. In some examples, the timing circuitry 306 restarts the timer in response to the gaze tracking circuitry 304 determining that the eye gaze of the user 104 has switched to the second portion. In some examples, the timing circuitry 306 causes storage of the duration in the database 320. In some examples, the timing circuitry 306 is instantiated by processor circuitry executing timing circuitry instructions and/or configured to perform operations such as those represented by the flowchart of FIG. 9.

In the illustrated example of FIG. 3, the speaker identification circuitry 308 identifies and/or detects one or more speakers participating in the video conference. For example, the speaker identification circuitry 308 identifies one or more of the participants 116A, 116B of the video conference that are currently speaking and/or presenting. In some examples, the speaker identification circuitry 308 identifies the speaker(s) based on audio signal(s) obtained and/or otherwise received from the device 112 and/or transmitted to the device 112 from one or more participant devices of the other participant(s) 116A, 116B. For example, in response to determining that a volume (e.g., an average volume over a specified time period) associated with one or more of the audio signals satisfies (e.g., exceeds) a volume threshold, the speaker identification circuitry 308 identifies the speaker(s) as one or more of the participant(s) 116A, 116B corresponding to the one or more audio signals and not the user 104 of the device 112.

Additionally or alternatively, the speaker identification circuitry 308 processes image data to identify the speaker(s) during the video conference. For example, the speaker identification circuitry 308 can analyze the video frame(s) 212 generated by the camera 106 to detect, for example, movement of lips of the user 104 to determine if the user 104 is the speaker. The speaker identification circuitry 308 can analyze image data of the video conference interface in the display frames 322 and/or the video conference application data 323 to detect movement of the lips of the other participant(s) 116A, 116B. In some examples, the speaker identification circuitry 308 analyzes frames from the video streams of the other participants 116A, 116B in the application data 323 to identify the speaker(s). In such examples, the speaker identification circuitry 308 identifies the speaker(s) as one(s) of the user 104 and/or the participant(s) 116A, 116B for which the speaker identification circuitry 308 detects movement of the lips in the image data. In some examples, the speaker identification circuitry 308 is instantiated by processor circuitry executing speaker identification circuitry instructions and/or configured to perform operations such as those represented by the flowchart of FIG. 9.

In the illustrated example of FIG. 3, the pupil dilation monitoring circuitry 312 detects a pupillary response of the other participant(s) in the video conference to simulated eye contact with the user 104 as a result of the presentation of the gaze corrected frames 214 on the other participant devices. For example, the pupil dilation monitoring circuitry 312 analyzes the images of the participants 116A, 116B in the video conference interface 117 as captured in the display frames 322 and/or the video conference application data 323 to detect the pupils in the images of the other participants 116A, 116B. In some examples, the pupil dilation monitoring circuitry 312 processes video stream(s) from the participant device(s) of the other participant(s) 116A, 116B received by the video conference application installed on the device 112 and included in the video conference application data 323 to detect the pupils in the images of the other participants. The pupil dilation monitoring circuitry 312 determines and/or otherwise estimates a pupil dilation rate for f the other participant(s) 116A, 116B. In particular, the pupil dilation monitoring circuitry 312 measures a pupil size of eyes of the participant(s) 116A, 116B in the image data. In some examples, the pupil dilation monitoring circuitry 312 calculates a rate of change in the pupil size between subsequent ones of the frames, where the rate of change in the pupil size corresponds to a pupil dilation rate. In some examples, the pupil dilation monitoring circuitry 312 monitors and/or determines the pupil dilation rate of the other participant(s) 116A, 116B while the gaze corrected frames 214 are presented to the other participant(s) 116A, 116B. In some examples, the pupil dilation monitoring circuitry 312 is instantiated by processor circuitry executing response monitoring circuitry instructions and/or configured to perform operations such as those represented by the flowchart of FIG. 9.

In the illustrated example of FIG. 3, the participant analysis circuitry 316 identifies (e.g., predicts) whether one or more of the participants 116A, 116B of the video conference are looking at the user 104 during the video conference. In some examples, the participant analysis circuitry 316 executes one or more neural network models (e.g., the eye detection neural network model(s)) based on the images of the video conference interface 117 captured in the display frames 322 and/or the video conference application data 323 and/or the video frames from participant video stream(s) captured by the participant device(s) of the other participants 116A, 116B and included in the video conference application data 323. As a result of the execution, the participant analysis circuitry 316 predicts orientation(s) of eye(s) of the participant(s) 116A, 116B. In some examples, the participant analysis circuitry 316 accesses participant gaze information as detected by the gaze management circuitry 102 in communication with each participant device (e.g., via an application programming interface (API) that facilitates communication between the gaze management circuitry 102 and each device associated with respective participants of the video conference). For example, the gaze tracking circuitry 304 associated with the participant device of the first participant 116A can determine a direction of the gaze of the first participant 116A The gaze tracking circuitry 304 can obtain coordinates of the eye gaze of the first participant 116A relative to, for instance, the display screen of the device associated with the first participant 116A. The gaze tracking circuitry 304 can obtain the coordinates of the eye gaze of the user relative to the display screen of the device 112. The gaze tracking circuitry 304 can analyze the eye gaze coordinates of the first participant 116A to predict whether the first participant 116A is looking at a particular participant in the video conference, such as the user 106 or elsewhere (e.g., at a document). Similarly, the gaze tracking circuitry 304 can use the coordinates of the eye gaze of the user 106 to determine if the user 106 is looking at the first participant 116A. In some examples, the participant analysis circuitry 316 is instantiated by processor circuitry executing participant analysis circuitry instructions and/or configured to perform operations such as those represented by the flowchart of FIG. 9.

In the illustrated example of FIG. 3, the social feedback control circuitry 310 generates and/or selects feedback to be presented to the user 104 with respect to the user's eye gaze (e.g., the eye gaze in the gaze corrected frames 214) based on one or more social feedback models and information from one or more of the timing circuitry 306, the speaker identification circuitry 308, the pupil dilation monitoring circuitry 312, and/or the participant analysis circuitry 316. In some examples, the social feedback models include one or more heuristic (e.g., rule-based) models and/or one or more neural network models (e.g., social feedback neural network model(s)) generated and/or trained based on reference data associated with interpersonal communications, social interaction studies, etc. In some examples, based on the social feedback model(s), the social feedback control circuitry 310 determines whether the eye gaze of the user 104 is consistent with and/or satisfies guidelines or recommendations for eye contact in interpersonal conversations. The eye gaze guidelines and/or recommendations can be customized based on factors such as, for example, the number of participants in the video call, geographical locations in which the video conference application is being used (which can be indicative of social expectations for different cultures), etc. The social feedback control circuitry 310 evaluates and/or executes the social feedback model(s) based on a direction and/or duration associated with the eye gaze of the user 104 as output in the gaze corrected frames 214 to determine whether the social feedback control circuitry 310 should provide alerts or suggestions to the user 104 to adjust the eye gaze. As disclosed herein, the social feedback neural network model(s) may be preloaded in the social feedback control circuitry 310 and/or trained by the training control circuitry 110 of FIG. 1.

To execute and/or evaluate the social feedback model(s), the social feedback control circuitry 310 obtains, from the gaze tracking circuitry 304, information regarding a portion of the video conference interface toward which the eye gaze of the user 104 is direction and/or content associated with the portion of the video conference interface. In some examples, the social feedback control circuitry 310 obtains, from the timing circuitry 306, the duration for which the user 104 directs his or her eye gaze toward the identified portion. In some examples, the social feedback control circuitry 310 receives the speaker identification information from the speaker identification circuitry 308. In some examples, the social feedback control circuitry 310 receives the pupil dilation rate of the other participants as determined by the pupil dilation monitoring circuitry 312. In some examples, the social feedback control circuitry 310 receives information about which other participants are looking at the user 104 from the participant analysis circuitry 316.

In some examples, the social feedback control circuitry 310 selects and/or determines an eye gaze time threshold based on the social feedback model(s). In some examples, the eye gaze time threshold represents a threshold duration for which the user 104 is recommended to direct his or her eye gaze at the identified portion of the video conference interface to prevent, for instance, the appearance of unintentional staring at one of the participants. In some examples, the social feedback control circuitry 310 selects and/or determines the eye gaze time threshold based on the content associated with the portion of the video conference interface (e.g., whether the images in the interface only include images of the participants, or a combination of participants and documents), a number of participants participating in the video conference, a number of the participants receiving the gaze corrected frames 214, etc.

In some examples, the social feedback control circuitry 310 adjusts the eye gaze time threshold based on the pupil dilation rate(s) determined by the pupil dilation monitoring circuitry 312. For example, the social feedback control circuitry 310 may increase the eye gaze time threshold when the pupil dilation rate(s) satisfy (e.g., are at or above) a pupil dilation rate threshold, which can indicate that the other participant(s) are responding positively to eye contact from the user 104 as provided by the gaze corrected frames 214. In some examples, the social feedback control circuitry 310 selects the eye gaze time threshold based on identification of the speaker(s) in the video conference and whether the gaze tracking circuitry 304 indicates that the user's gaze is directed toward or away from the speaker(s).

In the example of FIG. 3, the social feedback control circuitry 310 compares the duration associated with the eye gaze as provided in the gaze corrected frames 214 and as measured by the timing circuitry 306 to the eye gaze time threshold. In some examples, in response to the duration satisfying (e.g., being at or above) the eye gaze time threshold, the social feedback control circuitry 310 generates and/or selects feedback to be presented to the user 104. For example, the social feedback control circuitry 310 causes the user interface control circuitry 314 to provide feedback to the user 104 via one or more example alerts (e.g., notifications) 324. In some examples, the alerts 324 include visual and/or audio instructions presented by the device 112 of FIG. 1 to the user 104. In some examples, the alerts 324 can recommend that the user 104 to maintain and/or direct his or her eye gaze toward a particular portion of the video conference interface. For instance, the alerts 324 can recommend that the user 104 adjust his or her gaze toward the eyes of the other participant(s) 116A, 116B identified as speaker(s) and away from the eyes of the other participant(s) 116A, 116B not identified as speaker(s). In some examples, the alerts 324 can recommend that the user 104 can recommend that the user 104 look toward the display 114 if (a) the gaze tracking circuitry 304 determines that the user 104 is looking away from the display 114 and (b) the speaker identification circuitry 308 determines that the user 104 is the speaker.

In some examples, the social feedback control circuitry 310 can recommend, via the alert(s) 324, that the user 104 look away from one of participants 116A, 116B when the duration for which the gaze corrected frames 214 have been output to that participant 116A, 116B exceeds a first eye gaze time threshold (e.g., 4 seconds, 10 seconds, etc.). Additionally or alternatively, in response to determining that the user 104 is looking away from the display 114 of the device 112 for more than a second eye gaze time threshold (e.g., 3 seconds, 5 seconds, etc.), the social feedback control circuitry 310 may recommend that the user 104 to look at the other participant(s) 116A, 116B. In some examples, the social feedback control circuitry 310 can suggest, via the alert(s) 324, that the user 104 direct his or her eye gaze toward one or more of the participants 116A, 116B identified by the participant analysis circuitry 316 to be making eye contact with the user 104, thereby enabling synchronization of eye contact between the user 104 and the one or more participants 116A, 116B. In some examples, when the gaze correction circuitry 108 is unable to generate the gaze corrected frames 214 from the video frame(s) 212 due to low or dark lighting conditions in the ambient environment in which the user 104 is located, the social feedback control circuitry 310 can suggest, via the alert(s) 324, that the user 104 adjust the ambient lighting conditions (e.g., by turning on and/or increasing a brightness of light in an environment of the user 104). In some examples, the social feedback control circuitry 310 is instantiated by processor circuitry executing social feedback control circuitry instructions and/or configured to perform operations such as those represented by the flowchart of FIG. 9.

The user interface control circuitry 314 can output the alerts 324 for presentation based on instructions from the social feedback control circuitry 310. The alerts 324 can include visual alerts presented with the video conference interface 117. In some examples, the alerts 324 can include one or more bounding boxes that overlay the video conference interface 117 where the bounding boxes indicate the other participant(s) in the video conference toward which the corrected eye gaze of the user 104 is directed. In some such examples, a feature (e.g., color, size) of the bounding box(es) may change based on a duration for which the user 104 is gazing at the particular participant. For example, the bounding box(es) may be a first color (e.g., green) when user's gaze in the gaze corrected frames 214 is directed at one of the participants 116A, 116B for less than an eye gaze time threshold. Based on instructions from the social feedback control circuitry 310, the user interface control circuitry 314 can cause the bounding box(es) turn a second color (e.g., orange) when user's gaze in the gaze corrected frames 214 has been directed at the one of the participants 116A, 116B for at least the eye gaze time threshold. As another example, based on instructions from the social feedback control circuitry 310, the user interface control circuitry 314 can cause the bounding box(es) turn a second color (e.g., orange) when user's gaze in the gaze corrected frames 214 is directed toward a participant who has not been identified as the speaker by the speaker identification circuitry 308. In some examples, a color of the bounding box(es) transitions from the first color to the second color over time, such that the color of the bounding box(es) is proportional to the duration associated with the eye gaze of the user 104 toward a particular participant. Additionally or alternatively, the alerts 324 can include audio alerts (e.g., chimes or other sounds to attract the user's attention).

In some examples, the gaze management circuitry 102 includes means for obtaining data. For example, the means for obtaining data may be implemented by the input interface circuitry 302. In some examples, the input interface circuitry 302 may be instantiated by processor circuitry such as the example processor circuitry 1212 of FIG. 12. For instance, the input interface circuitry 302 may be instantiated by the example microprocessor 1400 of FIG. 14 executing machine executable instructions such as those implemented by at least blocks 902, 904, 906 of FIG. 9. In some examples, the input interface circuitry 302 may be instantiated by hardware logic circuitry, which may be implemented by an ASIC, XPU, or the FPGA circuitry 1500 of FIG. 15 structured to perform operations corresponding to the machine readable instructions. Additionally or alternatively, the input interface circuitry 302 may be instantiated by any other combination of hardware, software, and/or firmware. For example, the input interface circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for tracking. For example, the means for tracking may be implemented by the gaze tracking circuitry 304. In some examples, the gaze tracking circuitry 304 may be instantiated by processor circuitry such as the example processor circuitry 1212 of FIG. 12. For instance, the gaze tracking circuitry 304 may be instantiated by the example microprocessor 1400 of FIG. 14 executing machine executable instructions such as those implemented by at least blocks 910, 912, 930 of FIG. 9. In some examples, the gaze tracking circuitry 304 may be instantiated by hardware logic circuitry, which may be implemented by an ASIC, XPU, or the FPGA circuitry 1500 of FIG. 15 structured to perform operations corresponding to the machine readable instructions. Additionally or alternatively, the gaze tracking circuitry 304 may be instantiated by any other combination of hardware, software, and/or firmware. For example, the gaze tracking circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for timing. For example, the means for timing may be implemented by the timing circuitry 306. In some examples, the timing circuitry 306 may be instantiated by processor circuitry such as the example processor circuitry 1212 of FIG. 12. For instance, the timing circuitry 306 may be instantiated by the example microprocessor 1400 of FIG. 14 executing machine executable instructions such as those implemented by at least block 918 of FIG. 9. In some examples, the timing circuitry 306 may be instantiated by hardware logic circuitry, which may be implemented by an ASIC, XPU, or the FPGA circuitry 1500 of FIG. 15 structured to perform operations corresponding to the machine readable instructions. Additionally or alternatively, the timing circuitry 306 may be instantiated by any other combination of hardware, software, and/or firmware. For example, the timing circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for identifying speakers. For example, the means for identifying speakers may be implemented by the speaker identification circuitry 308. In some examples, the speaker identification circuitry 308 may be instantiated by processor circuitry such as the example processor circuitry 1212 of FIG. 12. For instance, the speaker identification circuitry 308 may be instantiated by the example microprocessor 1400 of FIG. 14 executing machine executable instructions such as those implemented by at least block 920 of FIG. 9. In some examples, the speaker identification circuitry 308 may be instantiated by hardware logic circuitry, which may be implemented by an ASIC, XPU, or the FPGA circuitry 1500 of FIG. 15 structured to perform operations corresponding to the machine readable instructions. Additionally or alternatively, the speaker identification circuitry 308 may be instantiated by any other combination of hardware, software, and/or firmware. For example, the speaker identification circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for providing social feedback. For example, the means for providing social feedback may be implemented by the social feedback control circuitry 310. In some examples, the social feedback control circuitry 310 may be instantiated by processor circuitry such as the example processor circuitry 1212 of FIG. 12. For instance, the social feedback control circuitry 310 may be instantiated by the example microprocessor 1400 of FIG. 14 executing machine executable instructions such as those implemented by at least blocks 926, 928 of FIG. 9. In some examples, the social feedback control circuitry 310 may be instantiated by hardware logic circuitry, which may be implemented by an ASIC, XPU, or the FPGA circuitry 1500 of FIG. 15 structured to perform operations corresponding to the machine readable instructions. Additionally or alternatively, the social feedback control circuitry 310 may be instantiated by any other combination of hardware, software, and/or firmware. For example, the social feedback control circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for monitoring pupil dilation. For example, the means for monitoring pupil dilation may be implemented by the pupil dilation monitoring circuitry 312. In some examples, the pupil dilation monitoring circuitry 312 may be instantiated by processor circuitry such as the example processor circuitry 1212 of FIG. 12. For instance, the pupil dilation monitoring circuitry 312 may be instantiated by the example microprocessor 1400 of FIG. 14 executing machine executable instructions such as those implemented by at least block 924 of FIG. 9. In some examples, the pupil dilation monitoring circuitry 312 may be instantiated by hardware logic circuitry, which may be implemented by an ASIC, XPU, or the FPGA circuitry 1500 of FIG. 15 structured to perform operations corresponding to the machine readable instructions. Additionally or alternatively, the pupil dilation monitoring circuitry 312 may be instantiated by any other combination of hardware, software, and/or firmware. For example, the pupil dilation monitoring circuitry 312 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for controlling a user interface. For example, the means for controlling the user interface may be implemented by the user interface control circuitry 314. In some examples, the user interface control circuitry 314 may be instantiated by processor circuitry such as the example processor circuitry 1212 of FIG. 12. For instance, the user interface control circuitry 314 may be instantiated by the example microprocessor 1400 of FIG. 14 executing machine executable instructions such as those implemented by at least blocks 908, 932 of FIG. 9. In some examples, the user interface control circuitry 314 may be instantiated by hardware logic circuitry, which may be implemented by an ASIC, XPU, or the FPGA circuitry 1500 of FIG. 15 structured to perform operations corresponding to the machine readable instructions. Additionally or alternatively, the user interface control circuitry 314 may be instantiated by any other combination of hardware, software, and/or firmware. For example, the user interface control circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for analyzing participants. For example, the means for analyzing participants may be implemented by the participant analysis circuitry 316. In some examples, the participant analysis circuitry 316 may be instantiated by processor circuitry such as the example processor circuitry 1212 of FIG. 12. For instance, the participant analysis circuitry 316 may be instantiated by the example microprocessor 1400 of FIG. 14 executing machine executable instructions such as those implemented by at least block 922 of FIG. 9. In some examples, the participant analysis circuitry 316 may be instantiated by hardware logic circuitry, which may be implemented by an ASIC, XPU, or the FPGA circuitry 1500 of FIG. 15 structured to perform operations corresponding to the machine readable instructions. Additionally or alternatively, the participant analysis circuitry 316 may be instantiated by any other combination of hardware, software, and/or firmware. For example, the participant analysis circuitry 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the gaze management circuitry 102 includes means for generating instructions. For example, the means for generating instructions may be implemented by the instruction generation circuitry 318. In some examples, the instruction generation circuitry 318 may be instantiated by processor circuitry such as the example processor circuitry 1212 of FIG. 12. For instance, the instruction generation circuitry 318 may be instantiated by the example microprocessor 1400 of FIG. 14 executing machine executable instructions such as those implemented by at least blocks 914, 916 of FIG. 9. In some examples, the instruction generation circuitry 318 may be instantiated by hardware logic circuitry, which may be implemented by an ASIC, XPU, or the FPGA circuitry 1500 of FIG. 15 structured to perform operations corresponding to the machine readable instructions. Additionally or alternatively, the instruction generation circuitry 318 may be instantiated by any other combination of hardware, software, and/or firmware. For example, the instruction generation circuitry 318 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the gaze management circuitry 102 of FIG. 1 is illustrated in FIG. 3, one or more of the elements, processes, and/or devices illustrated in FIG. 3 may be combined, divided, re-arranged, omitted, eliminated, and/or implemented in any other way. Further, the example input interface circuitry 302, the example gaze tracking circuitry 304, the example timing circuitry 306, the example speaker identification circuitry 308, the example social feedback control circuitry 310, the example pupil dilation monitoring circuitry 312, the example user interface control circuitry 314, the example participant analysis circuitry 316, the example instruction generation circuitry 318, the example database 320, and/or, more generally, the example gaze management circuitry 102 of FIG. 3, may be implemented by hardware alone or by hardware in combination with software and/or firmware. Thus, for example, any of the example input interface circuitry 302, the example gaze tracking circuitry 304, the example timing circuitry 306, the example speaker identification circuitry 308, the example social feedback control circuitry 310, the example pupil dilation monitoring circuitry 312, the example user interface control circuitry 314, the example participant analysis circuitry 316, the example instruction generation circuitry 318, the example database 320, and/or, more generally, the example gaze management circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example gaze management circuitry 102 of FIG. 1 may include one or more elements, processes, and/or devices in addition to, or instead of, those illustrated in FIG. 3, and/or may include more than one of any or all of the illustrated elements, processes and devices.

Figure 4:
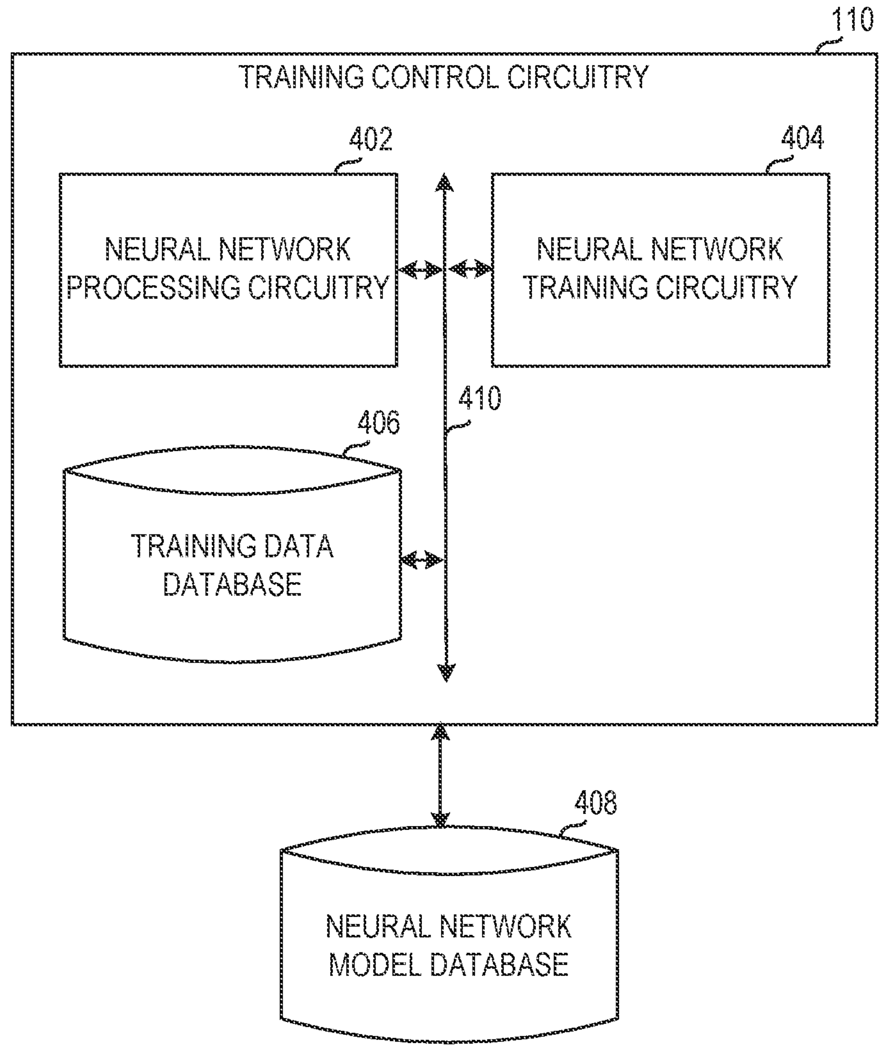
FIG. 4 is a block diagram of the example training control circuitry of FIG. 1 to train one or more machine learning models utilized by the gaze management circuitry of FIGS. 1 and/or 3.

FIG. 4 is a block diagram of the example training control circuitry 110 of FIG. 1 to train one or more machine learning models (e.g., neural network model(s)) utilized by the gaze management circuitry 102 of FIGS. 1 and/or 3. In particular, the training control circuitry 110 generates, trains, and/or stores one or more machine learning models utilized by the gaze management circuitry 102 of FIGS. 1 and/or 3 with respect to evaluating eye gaze of the user 104 and providing feedback with respect to eye gaze and interpersonal communications. The training control circuitry 110 may be instantiated (e.g., creating an instance of, bring into being for any length of time, materialize, implement, etc.) by processor circuitry such as a central processing unit executing instructions. Additionally or alternatively, the training control circuitry 110 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by one or more virtual machines and/or containers executing on the microprocessor.

In the illustrated example of FIG. 4, the training control circuitry 110 includes example neural network processing circuitry 402, example neural network training circuitry 404, and an example training data database 406.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, machine learning models based on Long Short-Term Memory (LSTM) architectures are used. In general, machine learning models/architectures that are suitable to use in the example approaches disclosed herein will be convolutional neural networks (CNNs). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In some examples, pre-trained model(s) are used. In some examples re-training may be performed. Such retraining may be performed in response to, for example, poor face detection due to, for instance, low ambient lighting.

Training is performed using training data. In examples disclosed herein, the training data originates from reference data including typical durations of eye contact in observed human interactions (e.g., human interactions such as conservations, meetings), a number of participants in the observed human interactions, a frequency for which speakers change during a conversation (e.g., one speaker during a meeting versus multiple speakers in a group session), pupil dilation rate(s) of the participant(s), a time of day of the conversations and the effects on eye gaze, demographics of the participant(s), geographic location of the participant(s), subject matter of the conversations, self-reported emotional responses of the participant(s), etc. In some examples, the participant(s) of the observed human interactions are monitored using cameras and/or wearable devices that track eye gaze and/or eye contact between participant(s). In such examples, the tracked eye gaze can be correlated with locations of face(s) of the other participant(s) to estimate duration(s) for which a participant is looking at the other participant(s), whether the participant(s) returned eye contact, duration(s) for which the other participant(s) returned eye contact, etc. In some examples, the reference data may be obtained based on a threshold number (e.g., thousands) of observed human interactions (e.g., live meetings) having different numbers of participants, different geographic locations, etc. In some examples, the reference defines rules for interactions between avatars and/or between humans and avatars with respect to eye gaze. Because supervised training is used, the training data is labeled.

Once training is complete, the model is deployed for use as an executable construct that processes an input and provides an output based on the network of nodes and connections defined in the model. In examples disclosed herein, the model(s) are stored at one or more databases (e.g., the neural network model database 408 of FIG. 4, the database 320 of FIG. 3, etc.). The model(s) may then be executed by the social feedback control circuitry 310 of the example gaze management circuitry 102 of FIG. 3.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 4, the example neural network training circuitry 404 performs training of the neural network(s) implemented by the neural network processing circuitry 402. In the example of FIG. 4, first training data can be stored in the training data database 406 and can include reference data including, for example, durations of eye contact for observed human interactions, a number of participants and/or speakers in the observed human interactions, pupil dilation rates of the participants, etc. In some examples, the reference data includes parameters for interactions between avatars and/or between humans and avatars (e.g., eye contact duration, gaze direction, etc.).

The neural network training circuitry 404 trains the neural network(s) implemented by the neural network processing circuitry 402 using the first training data to output eye gaze time threshold(s) based on content in a portion of a video conference interface toward which the user 104 is looking, the number of participants in the video conference, the pupil dilation rates of the participants, etc. In some examples, the neural network(s) determine that the alert(s) 324 should be generated to provide recommendations to the user 104 based on input(s) corresponding to a direction and/or duration associated with the eye gaze of the user 104. One or more social feedback model(s) are generated as a result of the neural network training. The social feedback model(s) are stored in the database 320 that is accessible by the gaze management circuitry 102. In some examples, the social feedback model(s) are stored in a different database. The databases 320, 408 may be the same storage device or different storage devices.

In some examples, the training control circuitry 110 includes means for processing neural networks. For example, the means for processing neural networks may be implemented by the neural network processing circuitry 402. In some examples, the neural network processing circuitry 402 may be instantiated by processor circuitry such as the example processor circuitry 1312 of FIG. 13. For instance, the neural network processing circuitry 402 may be instantiated by the example microprocessor 1400 of FIG. 14 executing machine executable instructions such as those implemented by at least blocks 1002, 1004 of FIG. 10. In some examples, the neural network processing circuitry 402 may be instantiated by hardware logic circuitry, which may be implemented by an ASIC, XPU, or the FPGA circuitry 1500 of FIG. 15 structured to perform operations corresponding to the machine readable instructions. Additionally or alternatively, the neural network processing circuitry 402 may be instantiated by any other combination of hardware, software, and/or firmware. For example, the neural network processing circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the training control circuitry 110 includes means for training neural networks. For example, the means for training neural networks may be implemented by the neural network training circuitry 404. In some examples, the neural network training circuitry 404 may be instantiated by processor circuitry such as the example processor circuitry 1312 of FIG. 13. For instance, the neural network training circuitry 404 may be instantiated by the example microprocessor 1400 of FIG. 14 executing machine executable instructions such as those implemented by at least blocks 1006, 1008, 1010, 1012 of FIG. 10. In some examples, the neural network training circuitry 404 may be instantiated by hardware logic circuitry, which may be implemented by an ASIC, XPU, or the FPGA circuitry 1500 of FIG. 15 structured to perform operations corresponding to the machine readable instructions. Additionally or alternatively, the neural network training circuitry 404 may be instantiated by any other combination of hardware, software, and/or firmware. For example, the neural network training circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the training control circuitry 110 of FIG. 1 is illustrated in FIG. 4, one or more of the elements, processes, and/or devices illustrated in FIG. 4 may be combined, divided, re-arranged, omitted, eliminated, and/or implemented in any other way. Further, the example neural network processing circuitry 402, the example neural network training circuitry 404, the example training data database 406, and/or, more generally, the example training control circuitry 110 of FIG. 4, may be implemented by hardware alone or by hardware in combination with software and/or firmware. Thus, for example, any of the example neural network processing circuitry 402, the example neural network training circuitry 404, the example training data database 406, and/or, more generally, the example training control circuitry 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example training control circuitry 110 of FIG. 1 may include one or more elements, processes, and/or devices in addition to, or instead of, those illustrated in FIG. 4, and/or may include more than one of any or all of the illustrated elements, processes and devices.

Figure 5:
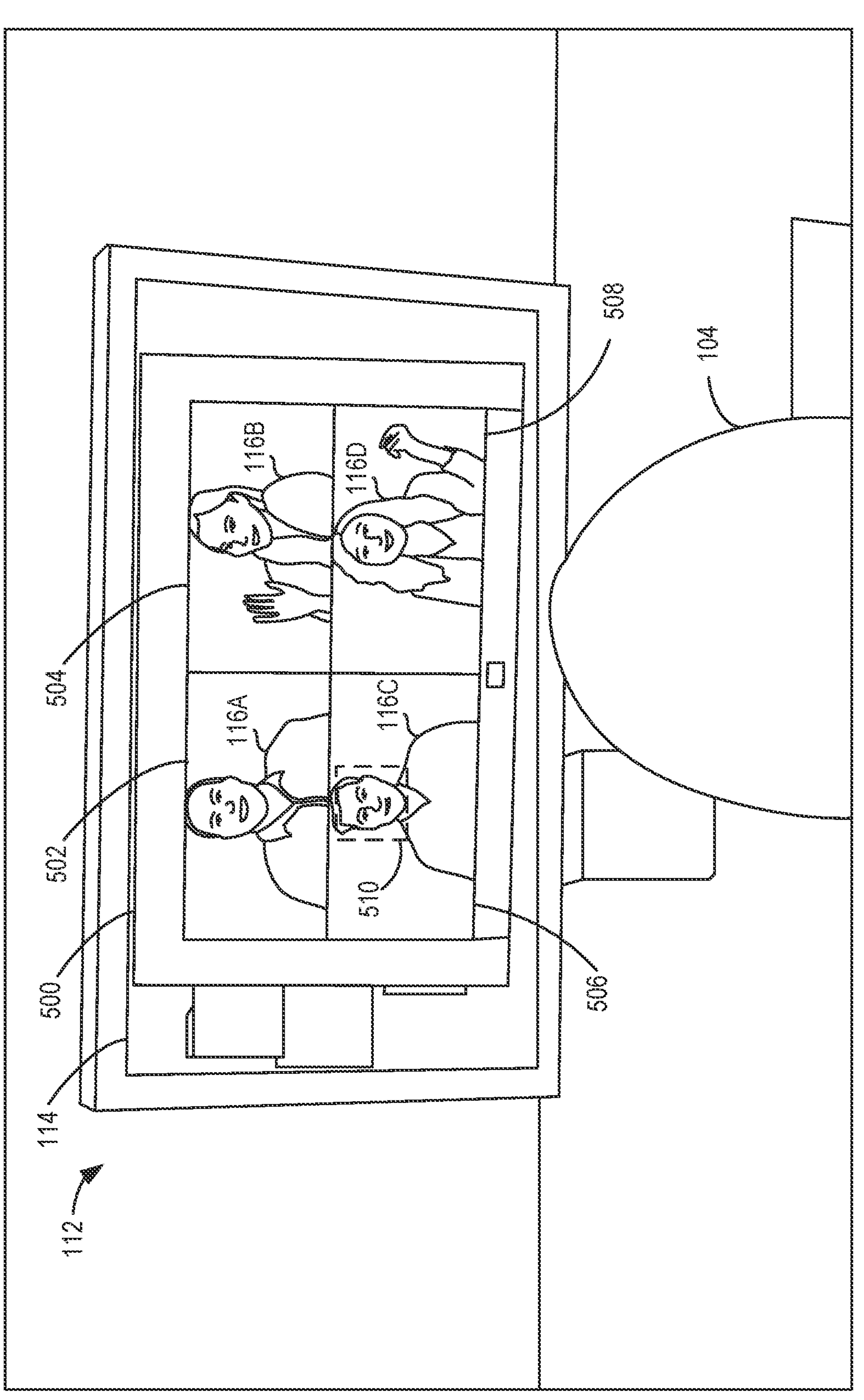
FIG. 5 illustrates an example video conference interface presented on a display of a user device in accordance with teachings of this disclosure.

FIG. 5 illustrates the example user 104 interacting with an example video conference interface 500 (e.g., the video conference interface 117 of FIG. 1) presented on the display 114 of the device 112 of FIG. 1. In the illustrated example of FIG. 5, the video conference interface 500 presents video streams corresponding to different participants of a video conference. For example, a first example portion 502 of the video conference interface 500 corresponds to a first video stream presenting images of a first participant 116A, a second example portion 504 of the video conference interface 500 corresponds to a second video stream presenting images of a second participant 116B, a third example portion 506 of the video conference interface 500 corresponds to a third video stream presenting images of a third participant 116C, and a fourth example portion 508 of the video conference interface 500 corresponds to a fourth video stream presenting images of a fourth participant 116D. While four of the participants 116A, 116B, 116C, 116D are shown in this example, a different number of participants may participate in the video conference. Also, other content (e.g., document(s)) can be presented on the display 114 with the video conference interface 500.

In the illustrated example of FIG. 5, the eye gaze of the user 104 as provided in the gaze corrected frames 214 generated by the gaze correction circuitry 108 is directed toward the face and/or eyes of the third participant 116C in the third portion 506 of the video conference interface 500. For example, the gaze tracking circuitry 304 of FIG. 3 analyzes the video frames 212 of the user 104 captured by the camera 106 and the display frames 322 of the video conference interface 500 to detect that the eye gaze of the user 104 is directed toward the third portion 506 and, more particularly, the third participant 116C. The gaze tracking circuitry 304 can instruct the frame correction circuitry 206 of FIG. 2 to output the gaze corrected frames 214 to the third participant 116C so that the third participant 116C perceives that the user 104 is making eye contact with the third participant 116C.

The user interface control circuitry 314 causes the video conference interface 500 to display an example bounding box 510 at a location of the face of the third participant 116C to indicate to the user 104 that the corrected eye gaze is directed toward the third participant 116C. Thus, in this example, the bounding box 510 identifies to the user 104 where his or her eye gaze is directed and, further, indicates to the user 104 that the third participant 116C is viewing the gaze corrected frames 214 of the user 104.

In some examples, a color of the bounding box 510 varies based on a duration for which the corrected eye gaze of the user 104 is directed toward the third portion 506. For example, the bounding box 510 may correspond to a first color (e.g., green) when the duration is less than the eye gaze time threshold. The user interface control circuitry 314 can cause the bounding box 510 to turn a second color (e.g., orange) different from the first color when the duration is at or above the eye gaze time threshold based on instructions from the social feedback control circuitry 310. In some examples, when the duration is at or above the eye gaze time threshold, the social feedback control circuitry 310 causes the video conference interface 500 to present one or more of the alerts 324 to the user 104 to instruct the user 104 to direct his or her eye gaze to a different portion of the video conference interface 500 and/or away from the display 114. In some such examples, the user interface control circuitry 314 causes the bounding box 510 to move to a new portion of the video conference interface 500 and/or causes a second boundary box to be presented at the new portion of the video conference interface 500 to guide or recommend that the user 104 direct his or her eye gaze toward the new portion of the video conference interface 500.

Figure 6:
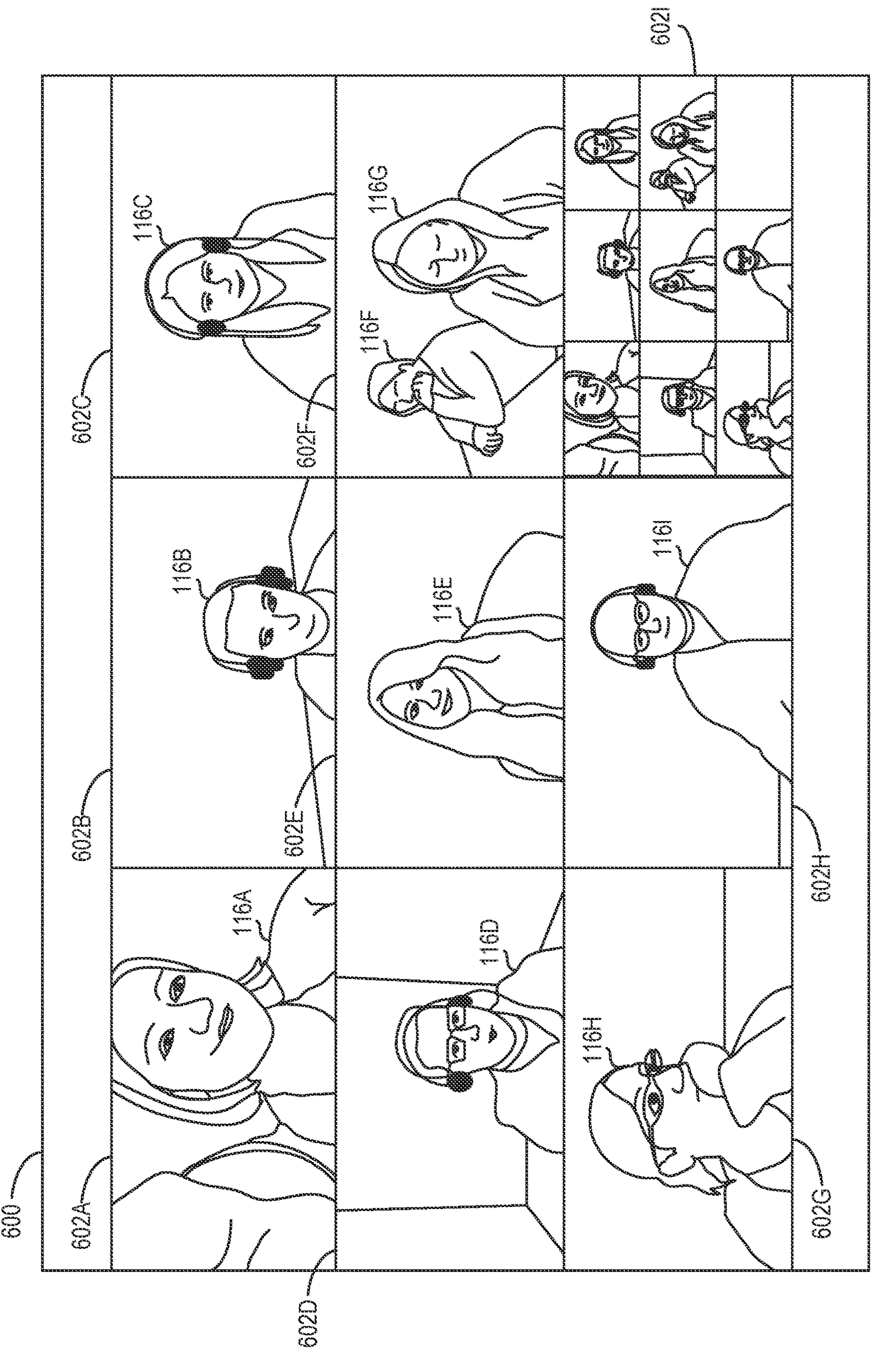
FIG. 6 illustrates a second example video conference interface that may be presented on a display of a user device in accordance with teachings of this disclosure.

FIG. 6 illustrates a second example video conference interface 600 (e.g., the video conference interface 117 of FIG. 1) that may be presented on the display 114 of the device 112. In the illustrated example of FIG. 6, example portions 602 (e.g., a first example portion 602A, a second example portion 602B, a third example portion 602C, a fourth example portion 602D, a fifth example portion 602E, a sixth example portion 602F, a seventh example portion 602G, and an eighth example portion 602H) of the second video conference interface 600 correspond to video streams associated with one or more respective participants 116 of a video conference. In the example of FIG. 6, in response to determining that the eye gaze of the user 104 of FIG. 1 is directed toward a particular one of the portions 602 of the second video conference interface 600, the gaze management circuitry 102 of FIG. 3 instructs the gaze correction circuitry 108 of FIG. 2 to cause the gaze corrected frames 214 to be presented to one or more of the participants 116 associated with the particular one of the portions 602.

In the illustrated example of FIG. 6, the second video conference interface 600 includes a ninth example portion (e.g., an all-receiving portion) 602I. In this example, the ninth portion 602I includes video streams from a plurality of the portions 602 of the second video conference interface 600. In some examples, the ninth portion 602I includes the video streams and/or representations thereof of all of the participants 116 in the video conference. In some examples, the ninth portion 602I includes the video streams and/or representations thereof corresponding to a subset of the participants 116 in the video call (e.g., four of the eight participants 116). In some examples, when the gaze tracking circuitry 304 determines that the eye gaze of the user 104 is directed toward the ninth portion 602I of the video conference interface 600, the gaze management circuitry 102 instructs the gaze correction circuitry 108 to output the gaze corrected frames 214 for transmission to the participant devices of each of the participants 116 included in the ninth portion 602I. In some examples, the user 104 can select, via the user input 326, one or more of the participants 116 to be included in the ninth portion 602I by providing user inputs via the video conference interface 600.

FIGS. 7A and 7B are example tables 700, 702 representing example rules (e.g., social feedback rules, heuristic rules) utilized by the social feedback control circuitry 310 of the example gaze management circuitry 102 of FIG. 3 to evaluate the eye gaze of the user 104 of FIG. 1 and to provide alerts and/or recommendations with respect to eye gaze behavior. In the example of FIGS. 7A and 7B, a first column 704 of each of the tables 700, 702 represents example conditions that may occur during a video conference (e.g., the user 104 looks toward or away from the camera 106 of FIG. 1, the user 104 looks toward or away from one of the participants 116 of the video conference, etc.). A second column 706 of each of the tables 700, 702 represents preferred durations and/or directions of eye gaze in a one-on-one video conference (e.g., between the user 104 and one other participant) for the corresponding conditions in the first column 704. A third column 708 in each of the tables 700, 702 represents preferred durations and/or directions of eye gaze in a multi-participant video conference (e.g., between the user 104 and at least two other participants) for the corresponding conditions in the first column 704.

The first table 700 of FIG. 7A includes one or more rules corresponding to an all-recipient scenario in which the gaze correction circuitry 108 of FIG. 2 causes the gaze corrected frames 214 for the user 104 to be transmitted for output to each of the participants 116 of a video conference. In some examples, the all-recipient scenario occurs when the eye gaze of the user 104 is directed toward a particular portion (e.g., the ninth portion 602I of FIG. 6) of a video conference interface (e.g., the video conference interface 500 of FIG. 5 and/or the second video conference interface 600 of FIG. 6). In some examples, the user 104 can select the all-recipient scenario by providing a user input 326 that is detected by the user interface control circuitry 314.

In the table 700 of FIG. 7A, a first example rule for the all-recipient scenario is shown in an example first row 710 of the first table 700. In this example, when the user 104 is looking away the camera 106 such that gaze correction cannot be performed by the gaze correction circuitry 108 (e.g., because the user's eye cannot be detected), the gaze management circuitry 102 causes the alert(s) 324 to instruct the user 104 to look at the other participant after 3 seconds in a one-on-one video conference. For instance, the alert(s) 324 generated by the social feedback control circuitry 310 can suggest that after 3 seconds have passed since the user 104 looked at the camera 106, the user 104 should direct his or her gaze to the other participant in the video conference. In the case of a multi-participant video conference, the alert(s) 324 generated by social feedback control circuitry 310 can recommend that the user 104 should direct his or her gaze to the other participant(s) 116 in the video conference after 5 seconds. Because there are fewer participants in the one-on-one conference than in the multi-participant video conference, the social feedback control circuitry 310 reduces the duration of time for which the user 104 is recommended to be looking away from the participant 116.

The second table 702 of FIG. 7B includes one or more rules corresponding to a single-recipient scenario in which the gaze correction circuitry 108 causes the gaze corrected frames 214 to be output for transmission to a participant device of a selected one of the participants 116 of the video conference. In some examples, the single-recipient scenario occurs when the gaze tracking circuitry 304 of FIG. 3 determines that the eye gaze of the user 104 is directed toward a particular portion of the video conference interface corresponding to a video stream associated with the selected one of the participants 116. One example rule for a single-recipient scenario is represented in an example second row 712 of the second table 702. In this example, when the user 104 is looking at one of the participants 116 who is speaking in the video conference, the gaze management circuitry 102 generates the alert(s) 324 to recommend that the user 104 break eye contract with the speaker after 4 seconds during a one-on-one video conference, but does not provide the alert(s) 324 during a multi-participant video conference. The social feedback control circuitry 310 may refrain from causing the alert(s) 324 to be provided in the multi-participant video conference examples because prolonged attention on a speaker may be expected in a large group setting as compared to a one-on-one conservation, where the participants typically break eye contact periodically. Such rules, parameters, customs, etc. can be defined in the training data used to train the models executed by the social feedback control circuitry 310 to evaluate eye gaze.

In the example of FIG. 7, additional example rules for the single-recipient scenario are represented in example rows 714, 716, 718, 720 of the second table 702. In some examples, one or more rules represented in the first table 700 and/or the second table 702 may be different. For example, the first table 700 and/or the second table 702 may include one or more different rules in addition to or instead of the rules shown in FIG. 7. For example, one or more of the rules represented in the first table 700 and/or the second table 702 may be different based on whether the participant(s) of the video conference are viewing captured images of the user 104 or an avatar representing the user 104.

Figure 8:
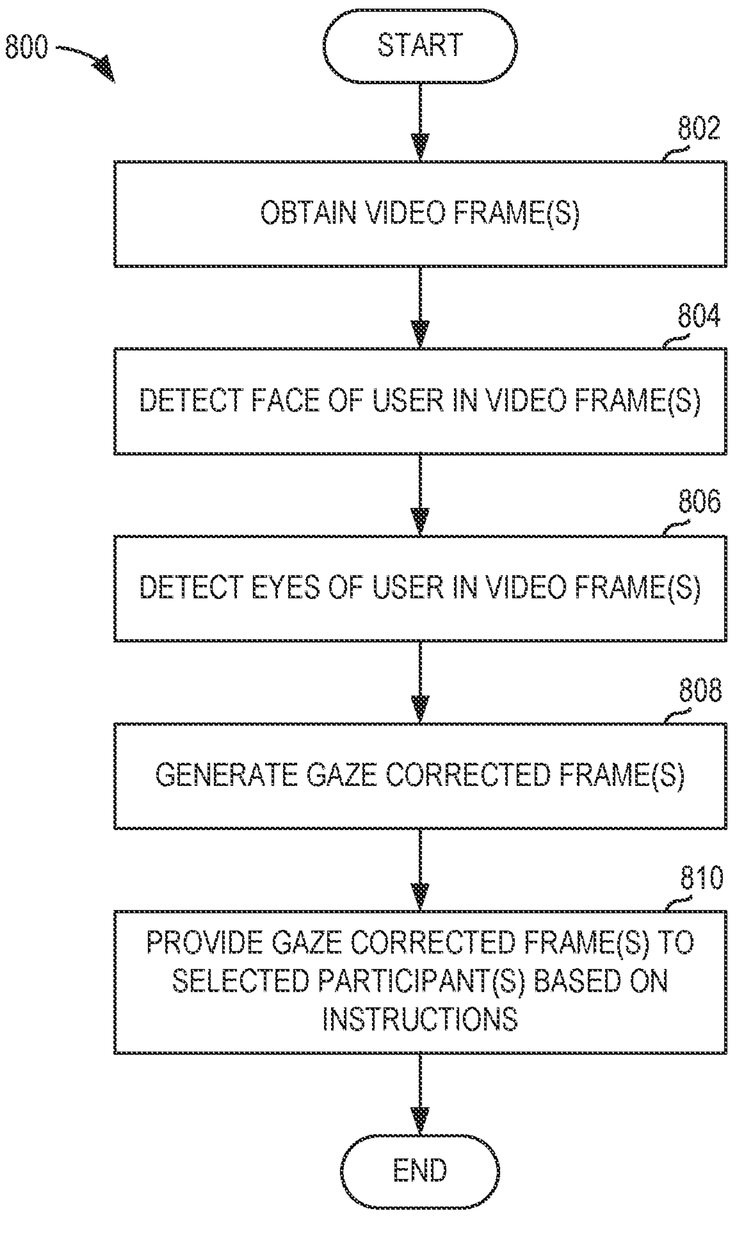
FIG. 8 is a flowchart representative of example machine readable instructions and/or example operations that may be executed and/or instantiated by the example gaze correction circuitry of FIGS. 1 and/or 2 to generate the example gaze corrected frames of FIG. 2.
Figure 9:
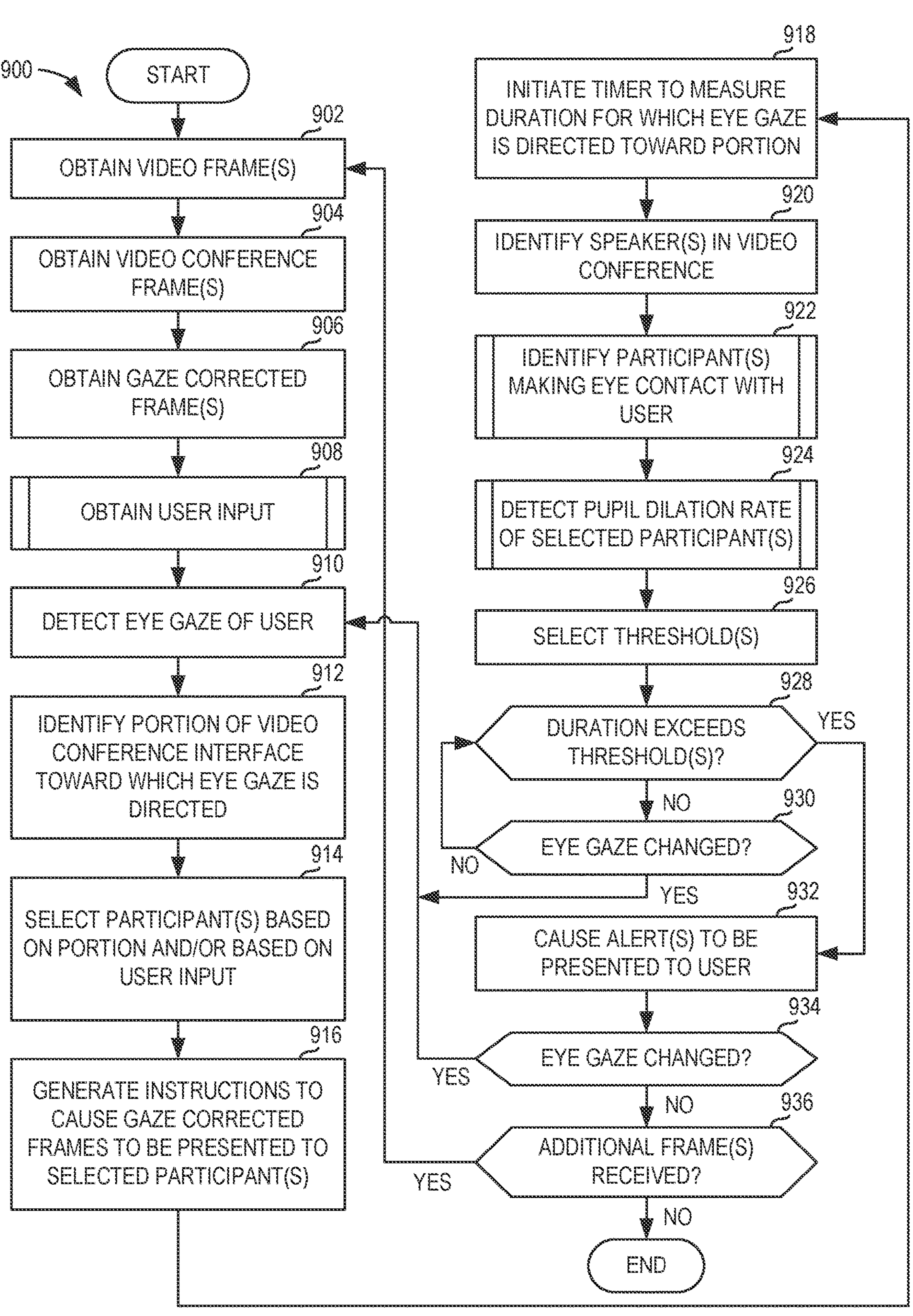
FIG. 9 is a flowchart representative of example machine readable instructions and/or example operations that may be executed and/or instantiated by the example gaze management circuitry of FIGS. 1 and/or 3 to facilitate adjustments to an eye gaze of a user during a video conference.
Figure 10:
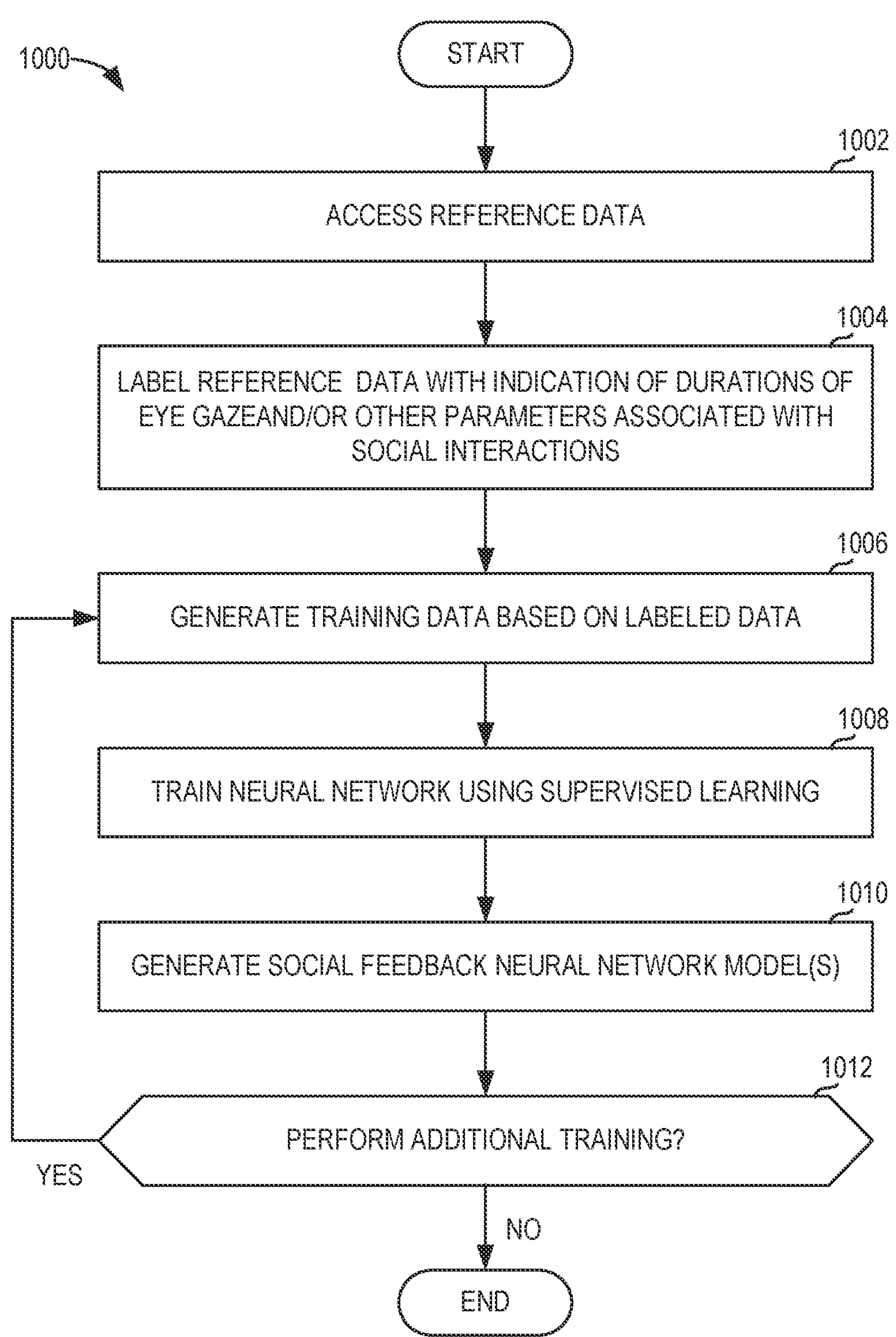
FIG. 10 is a flowchart representative of example machine readable instructions and/or example operations that may be executed and/or instantiated by the example training control circuitry of FIGS. 1 and/or 4 to generate and/or train one or more neural network models utilized by the example gaze management circuitry of FIGS. 1 and/or 3.

A flowchart representative of example hardware logic circuitry, machine readable instructions, hardware implemented state machines, and/or any combination thereof for implementing the gaze correction circuitry 108 of FIG. 2 is shown in FIG. 8. A flowchart representative of example hardware logic circuitry, machine readable instructions, hardware implemented state machines, and/or any combination thereof for implementing the gaze management circuitry 102 of FIG. 3 is shown in FIG. 9. A flowchart representative of example hardware logic circuitry, machine readable instructions, hardware implemented state machines, and/or any combination thereof for implementing the training control circuitry 110 of FIG. 4 is shown in FIG. 10. The machine readable instructions may be one or more executable programs or portion(s) of an executable program for execution by processor circuitry, such as the processor circuitry 1112, 1212, 1312 shown in the example processor platforms 1100, 1200, 1300 discussed below in connection with FIGS. 11, 12, and/or 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 8, 9, and/or 10, many other methods of implementing the example gaze correction circuitry 108, the example gaze management circuitry 102, and/or the example training control circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8, 9, and/or 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by the example gaze correction circuitry 108 of FIGS. 1 and/or 2 to generate the example gaze corrected frames 214 of FIG. 2. The machine readable instructions and/or the operations 800 of FIG. 8 begin at block 802, at which the example gaze correction circuitry 108 obtains the example video frame(s) 212 of FIG. 2. For example, the example face detection circuitry 202 of FIG. 2 obtains (e.g., extracts) the video frame(s) 212 from the example video stream signal 118 provided to the gaze correction circuitry 108 from the example camera 106 of FIG. 1. In some examples, the video frame(s) 212 correspond to images of the user 104 of FIG. 1 captured by the camera 106 during a video conference.

At block 804, the example gaze correction circuitry 108 detects a face of the user 104 in the video frame(s) 212. For example, the face detection circuitry 202 executes one or more face detection models to identify and/or predict locations of the face(s) in the video frames 212. In some examples, the face detection circuitry 202 executes one or more face orientation estimation models to determine an orientation (e.g., a yaw angle, a pitch angle, and/or a roll angle) of the face of the user 104 relative to the camera 106.

At block 806, the example gaze correction circuitry 108 detects the eyes 122 of the user 104 in the video frame(s) 212. For example, the example eye detection circuitry 204 of FIG. 2 analyzes the video frame(s) 212 to detect the eyes 122 of the detected face of the user 104 in the video frame(s) 212. In particular, the eye detection circuitry 204 can execute one or more eye detection models to identify and/or predict locations of the eye(s) 122 in the video frames 212. Further, in some examples, the eye detection circuitry 204 can determine an orientation of the eye(s) 122 of the user 104 relative to the camera 106 as a result of executing one or more eye orientation models.

At block 808, the example gaze correction circuitry 108 generates the gaze corrected frames 214 of FIG. 2 based on the video frame(s) 212. For example, the frame correction circuitry 206 generates the gaze corrected frames 214 by modifying and/or warping the eyes 122 of the user 104 in the video frame(s) 212 such that the user 104 appears to be looking toward the camera 106.

At block 810, the example gaze correction circuitry 108 provides the gaze corrected frames 214 to selected participant(s) of the video conference based on instructions received from the gaze management circuitry 102 of FIGS. 1 and/or 3. For example, the frame correction circuitry 206 obtains the example instructions 328 of FIG. 3 from the gaze management circuitry 102 of FIGS. 1 and/or 3, where the instructions 328 identify the selected participant(s) to which the gaze corrected frames 214 are to be presented. The frame correction circuitry 206 outputs the gaze corrected frames 214 for transmission to participant device(s) of the selected participant(s) and presentation to the selected participant(s).

FIG. 9 is a flowchart representative of example machine readable instructions and/or example operations 900 that may be executed and/or instantiated by the example gaze management circuitry 102 of FIGS. 1 and/or 3 to evaluate an eye gaze of the example user 104 of FIG. 1 during a video conference and to provide user feedback with respect to eye gaze behavior. The machine readable instructions and/or the operations 900 of FIG. 9 begin at block 902, at which the example gaze management circuitry 102 obtains the example video frame(s) 212 of FIG. 2. For example, the example input interface circuitry 302 of FIG. 3 obtains the video frame(s) 212 from the example video stream signal 118 provided to the gaze management circuitry 102 from the example camera 106 of FIG. 1. In some examples, the video frame(s) 212 correspond to images of the user 104 captured by the camera 106 during the video conference.

At block 904, the example gaze management circuitry 102 obtains the example display frame(s) 322 and/or the video conference application data 323 of FIG. 3. For example, the input interface circuitry 302 obtains the display frame(s) 322 from the example device 112 of FIG. 1. In some examples, the display frame(s) 322 and/or the video conference application data 323 correspond to images of a video conference interface 117, 500, 600 presented to the user 104 on the display 114 of the device 112 during the video conference.

At block 906, example gaze management circuitry 102 obtains the example gaze corrected frames 214 from the example gaze correction circuitry 108 of FIG. 2. For example, the input interface circuitry 302 obtains the gaze corrected frames 214 generated by the gaze correction circuitry 108 based on the video frame(s) 212.

In some examples, at block 908, the example gaze management circuitry 102 obtains the user input(s) 326 provided by the user 104 via the device 112. For example, the example user interface control circuitry 314 obtains the user input(s) 326 from the device 112. The user input(s) 326 may include, for example, selected participant(s) of the video conference to which the gaze corrected frames 214 are to be presented.

At block 910, the example gaze management circuitry 102 detects eye gaze of the user 104 in the video frame(s) 212. For example, the example gaze tracking circuitry 304 of FIG. 3 determines a direction of the eye gaze of the user 104 relative to the camera 106 based on an orientation of the eyes 122 of the user 104 in the video frame(s) 212. In some examples, the gaze tracking circuitry 304 obtains the orientation of the eyes 122 from the example eye detection circuitry 204 of the gaze correction circuitry 108 of FIG. 2. In some examples, the gaze tracking circuitry 304 r determines the orientation of the eyes 122 by executing one or more neural network models (e.g., the eye orientation model(s)).

At block 912, the example gaze management circuitry 102 identifies a portion of the display 114 (e.g., the video conference interface 117, 500, 600) toward which the eye gaze of the user 104 is directed. For example, the gaze tracking circuitry 304 compares the direction of the eye gaze of the user 104 in the video frame(s) 212 to the corresponding, time-synchronized display frame(s) 322 and/or video conference application data 323. The gaze tracking circuitry 304 can determine a portion of the video conference interface toward which the user 104 is looking, which may be correlated with the images of one or more participants of the video conference.

At block 914, the example gaze management circuitry 102 selects one or more participants of the video conference to receive the gaze corrected frames 214 based on the portion of the video conference interface toward which the user 104 is looking and/or based on the user input 326. For example, the example instruction generation circuitry 318 of FIG. 3 selects the participant(s) identified by the gaze tracking circuitry 304 based on the portion of the video conference interface to which the user's gaze is directed. Additionally or alternatively, the instruction generation circuitry 318 of FIG. 3 selects the participant(s) selected by the user 104 via the user input 326 to the device 112.

At block 916, the example gaze management circuitry 102 generates the example instructions 328 of FIG. 3 to cause the gaze corrected frames 214 to be presented to the selected participant(s). For example, the instruction generation circuitry 318 generates the instructions 328 which, when provided to the gaze correction circuitry 108, cause the gaze correction circuitry 108 to provide the gaze corrected frames 214 for transmission to participant device(s) of the selected participant(s) for presentation to the selected participant(s).

At block 918, the example gaze management circuitry 102 initiates a timer to measure a duration for which the eye gaze of the user 104 as provided in the gaze corrected frames 214 is directed toward the portion of the video conference interface. For example, the example timing circuitry 306 of FIG. 3 initiates the timer in response to the selection of a particular participant to receive the gaze corrected frames 214, and monitors the time elapsed from a starting time of the timer.

At block 920, the example gaze management circuitry 102 identifies one or more speakers participating in the video conference. In this example, the speaker(s) correspond to one or more participants of the video conference that are currently speaking and/or presenting. For example, the example speaker identification circuitry 308 identifies the speaker(s) in the video conference based on audio signal(s) received from the participant device(s) of the participant(s) in the video conference. Additionally or alternatively, the speaker identification circuitry 308 analyzes image data in the display frames 322 and/or the video conference application data 323 to identify the speaker(s) by detecting movement of lips of the participant(s). In some examples, the speaker identification circuitry 308 determines a number of the speaker(s) and/or location(s) of the speaker(s) in the video conference interface 117, 500, 600.

In some examples, at block 922, the example gaze management circuitry 102 identifies one or more participants making eye contact with the user 104 during the video conference. For example, the example participant analysis circuitry 316 analyzes image data in the display frames 322 and/or the video conference application data 323 to detect direction(s) of eye gaze of the participant(s). In some examples, the participant analysis circuitry 316 determines whether one or more of the participant(s) are looking at the user 104 during the video conference based on the direction(s) of eye gaze of the participant(s). In some examples, the participant analysis circuitry 316 determines a number of the one or more participant(s) and/or position(s) of the one or more participant(s) as presented within the video conference interface 117, 500, 600 who are making eye contact with the user 104 during the video conference.

In some examples, at block 924, the example gaze management circuitry 102 detects a pupil dilation rate(s) of the selected participant(s) who receive the gaze corrected frames 214. For example, the example pupil dilation monitoring circuitry 312 of FIG. 3 analyzes image data in the display frames 322 and/or the video conference application data 323 to detect pupil sizes of the participant(s) in subsequent video frames of the video streams. In some examples, the pupil dilation monitoring circuitry 312 determines the pupil dilation rate(s) by determining an average change in the pupil sizes between the subsequent video frames of the video streams for a specified duration and/or number of video frames.

At block 926, the example gaze management circuitry 102 selects one or more thresholds (e.g., eye gaze time threshold(s)) for evaluating the eye gaze of the user 104. For example, the example social feedback control circuitry 310 of FIG. 3 selects and/or determines the threshold(s) based on one or more social feedback models. In particular, the social feedback control circuitry 310 selects the threshold(s) by executing and/or evaluating the social feedback model(s) based on input parameters including one or more of the content in the portion of the video conference interface, a number of participants in the video conference, location(s) of the speaker(s) in the video conference interface, location(s) of participant(s) making eye contact with the user 104, pupil dilation rate(s) of the participant(s), etc. (e.g., parameters as identified at blocks 912 and 918-924 of FIG. 9) In some examples, the social feedback model(s) include heuristic (e.g., rule-based) models that can be evaluated by the social feedback control circuitry 310 to select the threshold(s). In some examples, the social feedback model(s) include one or more neural network models that may be executed, based on the input parameters, to output the threshold(s) and/or output an indication as to whether the eye gaze of the user 104 is recommended to be adjusted.

At block 928, the example gaze management circuitry 102 determines whether the duration of the eye gaze of the user 104 as provided in the gaze corrected frames 214 exceeds (e.g., satisfies) the threshold(s). For example, the social feedback control circuitry 310 obtains the duration of the eye gaze measured by the timing circuitry 306 and compares the duration to the threshold(s). In response to the social feedback control circuitry 310 determining that the duration does not exceed the threshold(s) (e.g., block 928 returns a result of NO), control proceeds to block 930. Alternatively, in response to the social feedback control circuitry 310 determining that the duration exceeds the threshold(s) (e.g., block 928 returns a result of YES), control proceeds to block 932.

At block 930, the example gaze management circuitry 102 determines whether the eye gaze of the user 104 has changed. For example, the gaze tracking circuitry 304 determines whether the direction of the eye gaze of the user 104 has changed such that the user 104 is no longer looking at the portion of the video conference interface including the participant selected to receive the gaze corrected frames 214. In response to the gaze tracking circuitry 304 determining that the eye gaze of the user 104 has changed (e.g., block 930 returns a result of YES), control returns to block 910. Alternatively, in response to the gaze tracking circuitry 304 determining that the eye gaze of the user 104 has not changed (e.g., block 930 returns a result of NO), control returns to block 928.

At block 932, the example gaze management circuitry 102 causes one or more of the alerts 324 of FIG. 3 to be presented to the user 104 based on the evaluation of user's gaze in the gaze corrected frames 214 by the social feedback control circuitry 310. For example, the user interface control circuitry 314 causes the display 114 of the device 112 to present the alert(s) 324 via the video conference interface, where the alert(s) 324 may include an indication to the user 104 as to the participant in the video conference interface 117, 500, 600 that the eye gaze associated with the gaze corrected frames 214 is directed. In some examples, the alert(s) 324 guide or recommend that the user 104 direct her or her eye gaze away from the portion of the video conference interface and/or toward a different portion of the video conference interface. In some examples, the alert(s) 324 include audio and/or visual notifications presented by the device 112 to the user 104.

At block 934, the example gaze management circuitry 102 determines whether the eye gaze of the user 104 has changed (e.g., in response to the alert(s) 324). In response to the gaze tracking circuitry 304 determining that the eye gaze of the user 104 has changed (e.g., block 934 returns a result of YES), control returns to block 910. Alternatively, in response to the gaze tracking circuitry 304 determining that the eye gaze of the user 104 has not changed (e.g., block 934 returns a result of NO), control proceeds to block 936.

At block 936, the gaze management circuitry 102 determines if additional video frame(s) 212 and/or gaze corrected frame(s) 214 have been received. In response to the input interface circuitry 302 receiving additional video frame(s) 212 and/or gaze corrected frame(s) 214 (e.g., block 936 returns a result of YES), control returns to block 902. Alternatively, control ends when no further video frame(s) 212 and/or gaze corrected frame(s) 214 have been received.

FIG. 10 is a flowchart representative of example machine readable instructions and/or example operations 1000 that may be executed and/or instantiated by the example training control circuitry 110 of FIGS. 1 and/or 4 to generate and/or train one or more neural network models utilized by the example gaze management circuitry 102 of FIGS. 1 and/or 3. The example instructions 1000 of FIG. 10, when executed by the training control circuitry 103 of FIG. 3, result in a neural network and/or a model thereof (e.g., the social feedback model(s)), that can be distributed to other computing systems, such as the social feedback control circuitry 310 of the example gaze management circuitry 102 of FIG. 3.

The machine readable instructions and/or the operations 1000 of FIG. 10 begin at block 1002, at which the example training control circuitry 110 accesses reference data with respect to, behaviors during interpersonal communications. The example neural network processing circuitry 402 of FIG. 4 can access the reference data stored in the example training data database 406 of FIG. 4 and/or the example database 320 of FIG. 3. The reference data can include data collected based on observed human interactions, including durations (e.g., observed and/or preferred durations) of eye contact during the interactions, a number of participants in the interactions, pupil dilation rates of the participants, etc.

At block 1004, the example training control circuitry 110 labels the reference data with indications of durations of eye gaze and/or other parameters associated with social interactions. For example, the neural network processing circuitry 402 labels the data to indicate the durations of eye contact between the participant(s) in each of the interactions represented in the data. In some examples, parameters include a number of participants in the interactions and/or pupil dilation rates of the participants are correlated with the durations. At block 1006, the example neural network training circuitry 30 generates training data based on the labeled data.

At block 1008, the example training control circuitry 110 trains one or more neural networks using the training data. For example, the neural network training circuitry 404 of FIG. 4 performs training of the neural network processing circuitry 402 based on supervised learning. As a result of the training, the social feedback model(s) (e.g., social feedback neural network model(s)) are generated at block 1010. Based on the social feedback model(s), the neural network is trained to identify preferred durations and/or directions of eye gaze in interactions (e.g., human interactions, interactions between avatars). In some examples, the social feedback model(s) are trained to predict preferred durations and/or directions of eye gaze based on the number of participants in an interaction (e.g., a video conference), pupil dilation rates of the participants, etc. The social feedback model(s) can be stored in the database 320 for access by the social feedback control circuitry 310 of the example gaze management circuitry 102 of FIG. 3. The example instructions 1000 of FIG. 10 end when no additional training (e.g., retraining) is to be performed.

Figure 11:
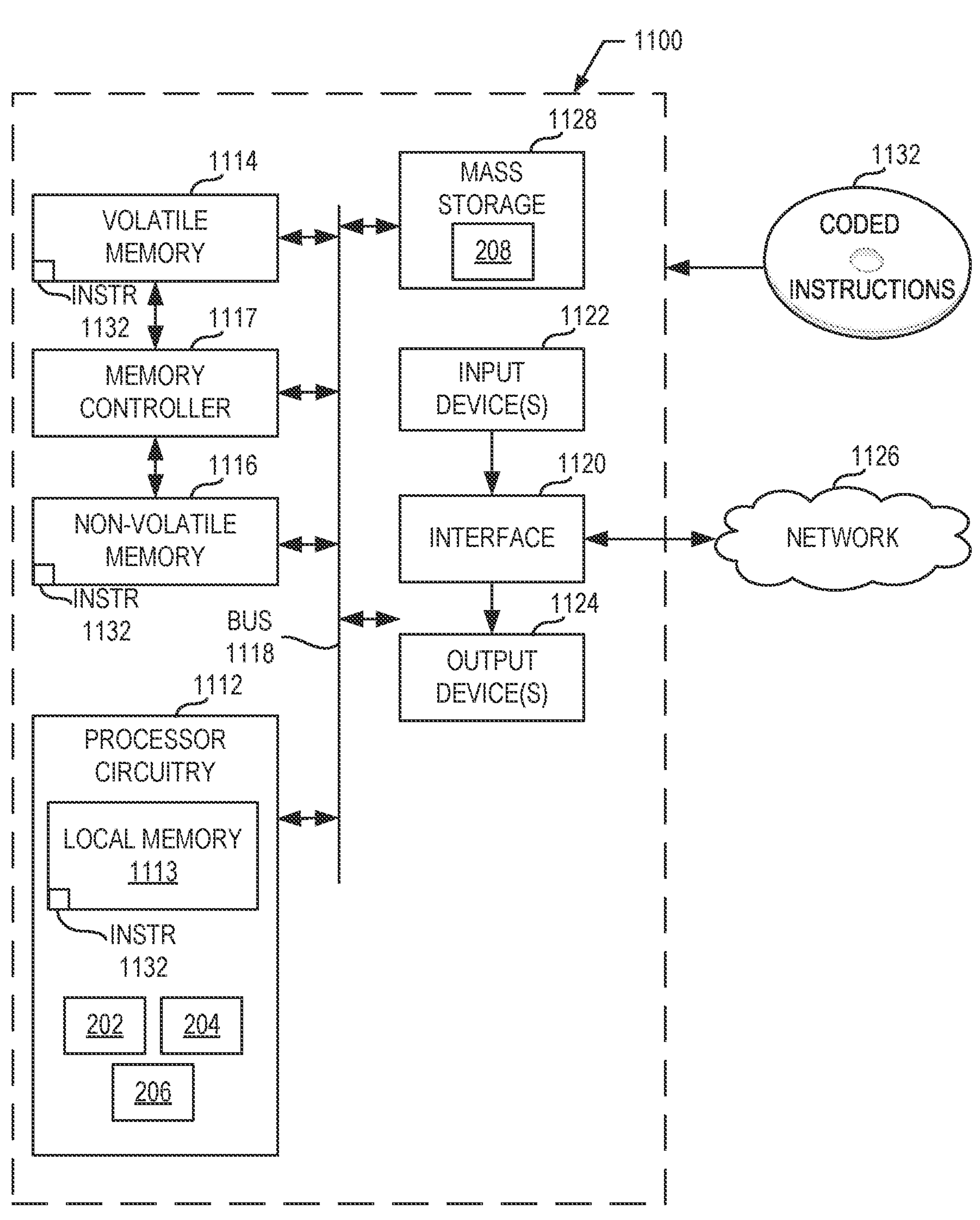
FIG. 11 is a block diagram of an example processor platform structured to execute and/or instantiate the machine readable instructions and/or the operations of FIG. 8 to implement the gaze correction circuitry 108 of FIG. 2.

FIG. 11 is a block diagram of an example processor platform 1100 structured to execute and/or instantiate the machine readable instructions and/or the operations of FIG. 8 to implement the gaze correction circuitry 108 of FIG. 2. The processor platform 1100 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example face detection circuitry 202, the example eye detection circuitry 204, and the example frame correction circuitry 206.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIG. 8, may be stored in the mass storage device 1128, in the volatile memory 1114, in the non-volatile memory 1116, and/or on a removable non-transitory computer readable storage medium such as a CD or DVD.

Figure 12:
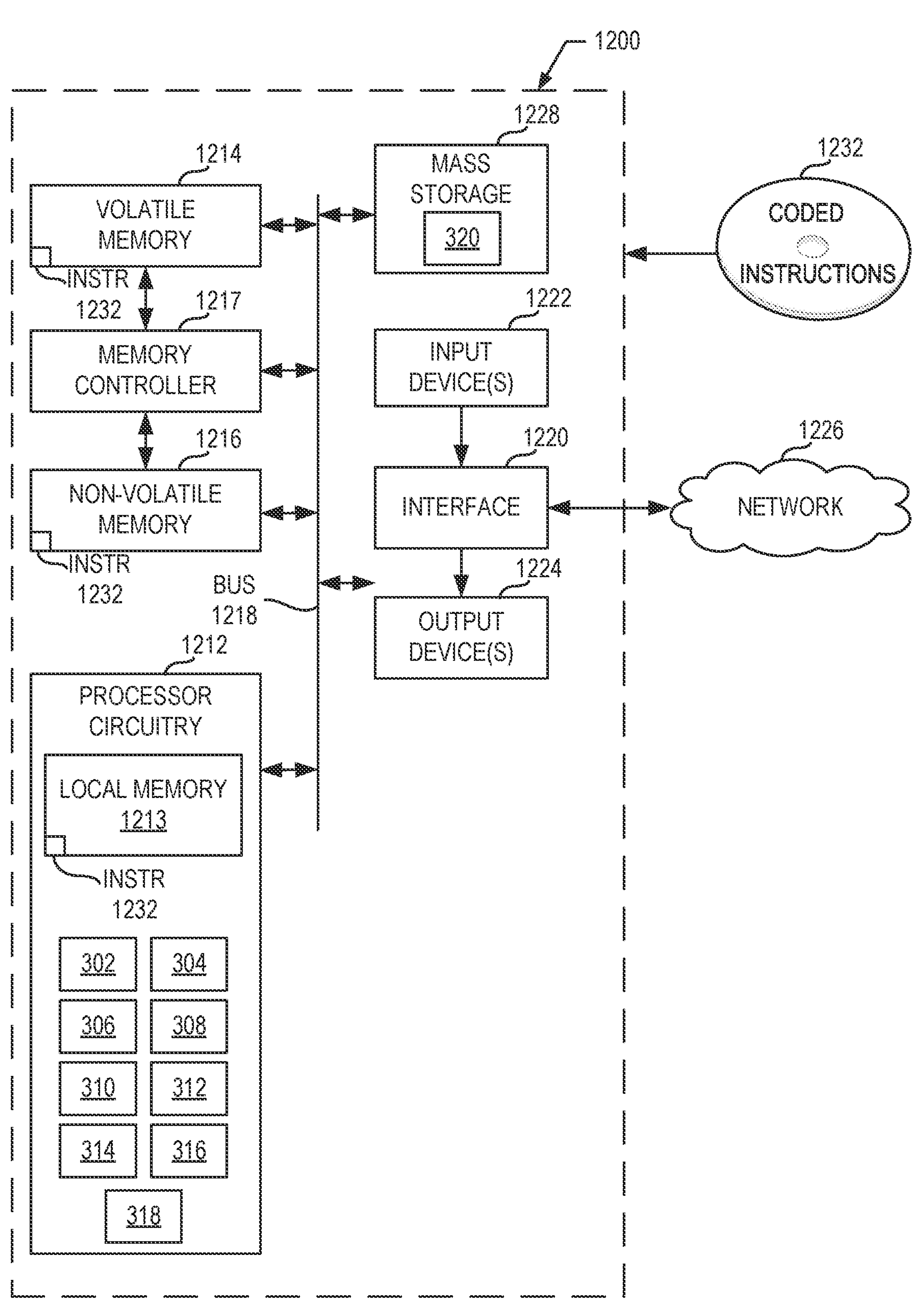
FIG. 12 is a block diagram of an example processor platform structured to execute and/or instantiate the machine readable instructions and/or the operations of FIG. 9 to implement the gaze management circuitry of FIG. 3.

FIG. 12 is a block diagram of an example processor platform 1200 structured to execute and/or instantiate the machine readable instructions and/or the operations of FIG. 9 to implement the gaze management circuitry 102 of FIG. 3. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example input interface circuitry 302, the example gaze tracking circuitry 304, the example timing circuitry 306, the example speaker identification circuitry 308, the example social feedback control circuitry 310, the example pupil dilation monitoring circuitry 312, the example user interface control circuitry 314, the example participant analysis circuitry 316, and the example instruction generation circuitry 318.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1232, which may be implemented by the machine readable instructions of FIG. 9, may be stored in the mass storage device 1228, in the volatile memory 1214, in the non-volatile memory 1216, and/or on a removable non-transitory computer readable storage medium such as a CD or DVD.

Figure 13:
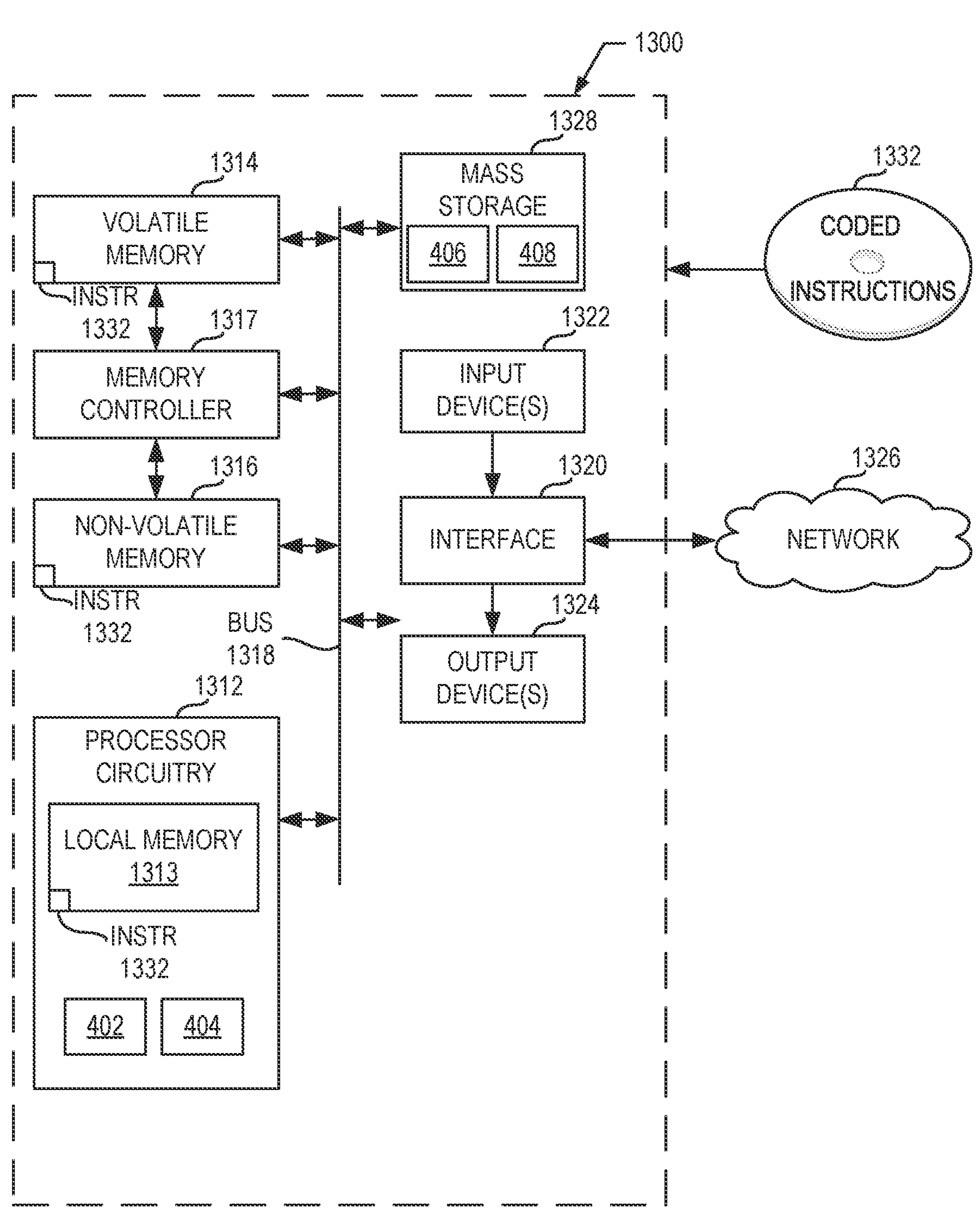
FIG. 13 is a block diagram of an example processor platform structured to execute and/or instantiate the machine readable instructions and/or the operations of FIG. 10 to implement the training control circuitry of FIG. 4.

FIG. 13 is a block diagram of an example processor platform 1300 structured to execute and/or instantiate the machine readable instructions and/or the operations of FIG. 10 to implement the training control circuitry 110 of FIG. 4. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example neural network processing circuitry 402 and the example neural network training circuitry 404.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIG. 10, may be stored in the mass storage device 1328, in the volatile memory 1314, in the non-volatile memory 1316, and/or on a removable non-transitory computer readable storage medium such as a CD or DVD.

Figure 14:
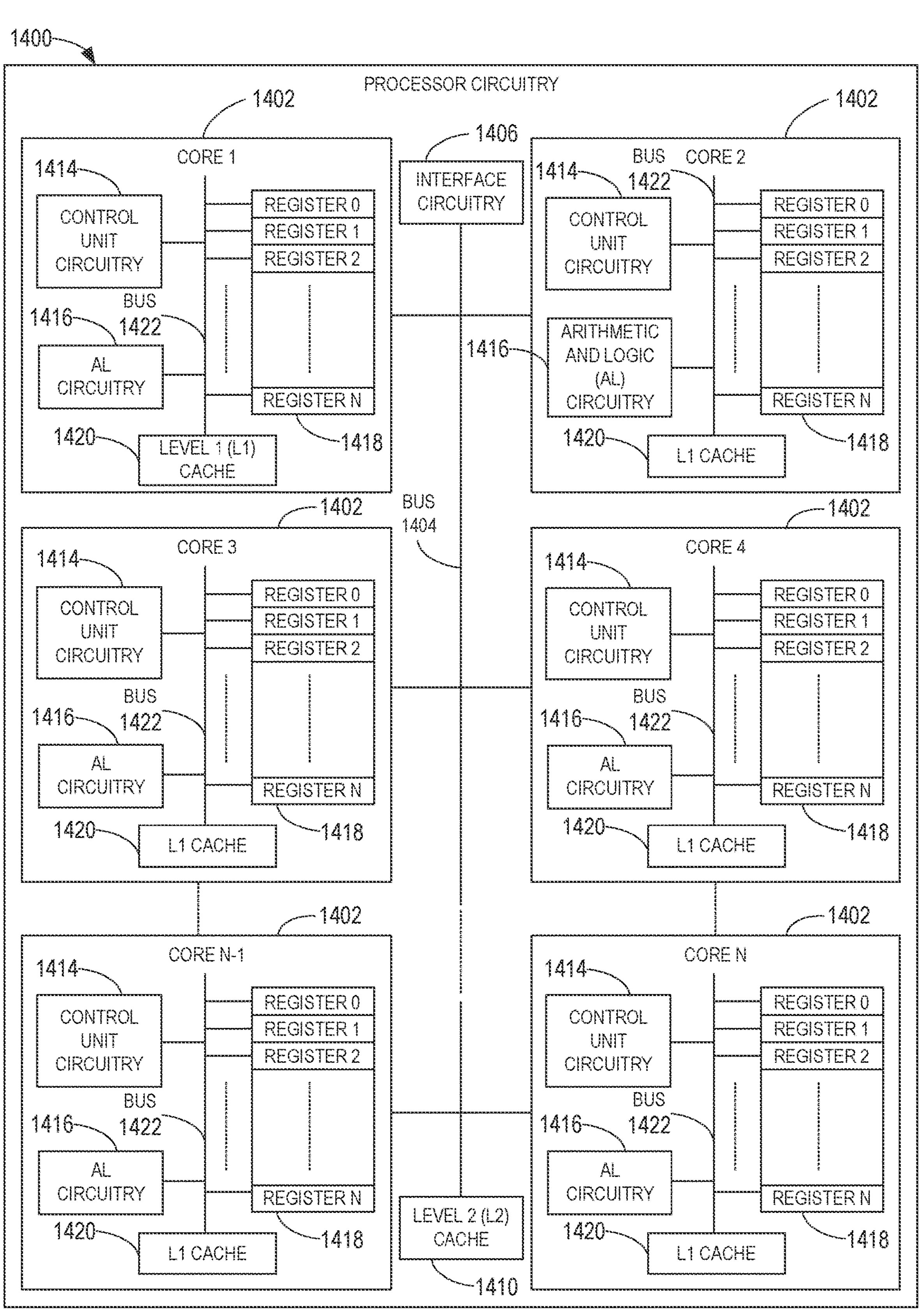
FIG. 14 is a block diagram of an example implementation of the processor circuitry of FIGS. 11-13.

FIG. 14 is a block diagram of an example implementation of the processor circuitry 1112 of FIG. 11, the processor circuitry 1212 of FIG. 12, and/or the processor circuitry 1312 of FIG. 13. In this example, the processor circuitry 1112 of FIG. 11, the processor circuitry 1212 of FIG. 12, and/or the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowcharts of FIGS. 8, 9 and/or 10 to effectively instantiate the circuitry of FIGS. 2, 3, and/or 4 as logic circuits to perform the operations corresponding to those machine readable instructions. In some such examples, the circuitry of FIGS. 2, 3, and/or 4 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 8-10.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1114, 1116 of FIG. 11, the main memory 1214, 1216 of FIG. 12, and/or the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
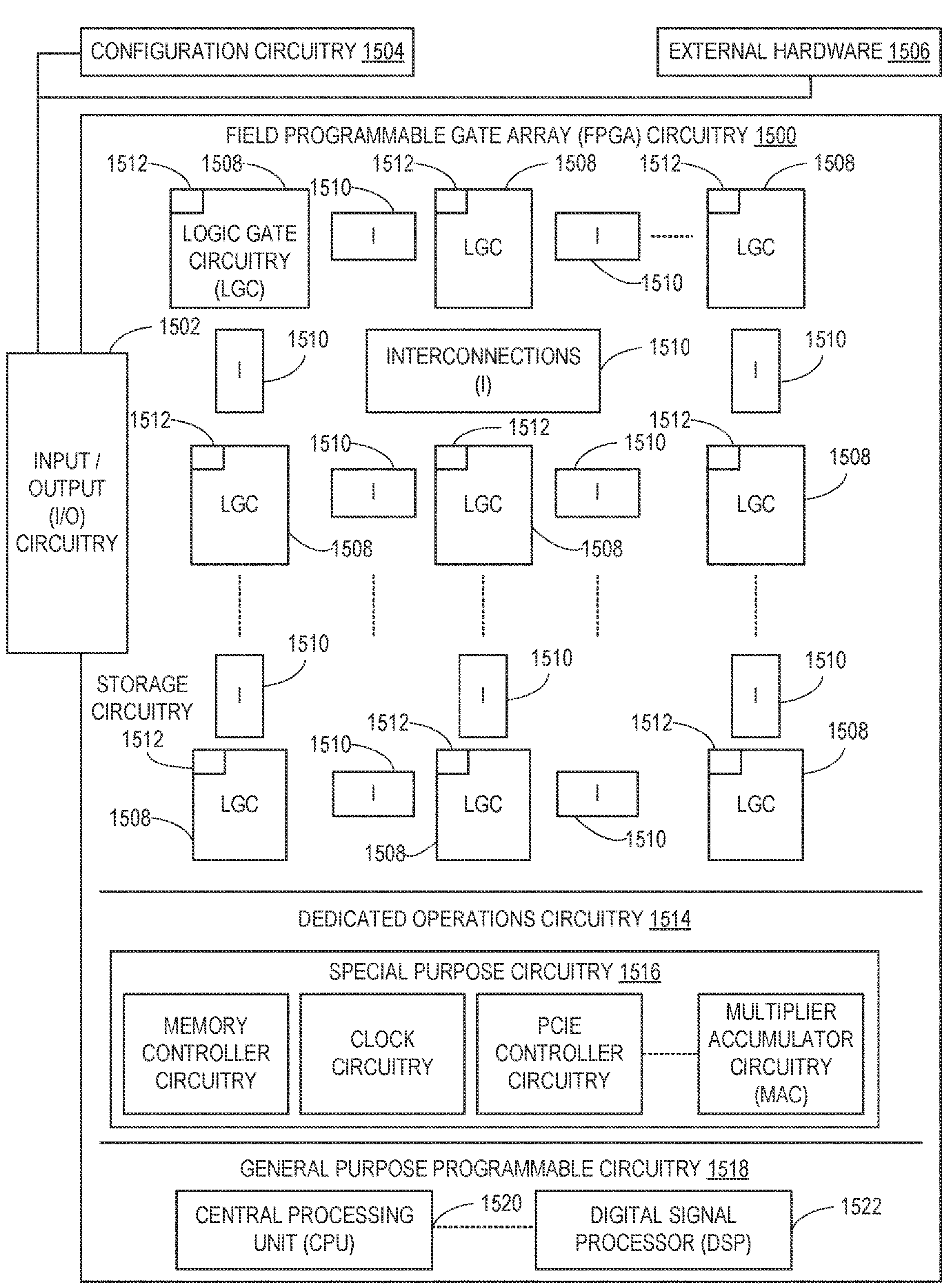
FIG. 15 is a block diagram of another example implementation of the processor circuitry of FIGS. 11-13.

FIG. 15 is a block diagram of another example implementation of the processor circuitry 1112 of FIG. 11, the processor circuitry 1212 of FIG. 12, and/or the processor circuitry 1312 of FIG. 13. In this example, the processor circuitry 1112 of FIG. 11, the processor circuitry 1212 of FIG. 12, and/or the processor circuitry 1312 of FIG. 13 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 8, 9, and/or 10 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 8, 9 and/or 10. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 8, 9, and/or 10. As such, the FPGA circuitry 1500 may be structured to effectively instantiate some or all of the machine readable instructions of the flowcharts of FIGS. 8, 9, and/or 10 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 8, 9, and/or 10 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 8-10 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1112 of FIG. 11, the processor circuitry 1212 of FIG. 12, and/or the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1112 of FIG. 11, the processor circuitry 1212 of FIG. 12, and/or the processor circuitry 1312 of FIG. 13 may additionally be implemented by combining the example microprocessor 1400 of FIG. 5 and the example FPGA circuitry 1500 of FIG. 15. In some such hybrid examples, a first portion of the machine readable instructions represented by the flowcharts of FIGS. 8, 9, and/or 10 may be executed by one or more of the cores 1402 of FIG. 4, a second portion of the machine readable instructions represented by the flowcharts of FIGS. 8, 9, and/or 10 may be executed by the FPGA circuitry 1500 of FIG. 15, and/or a third portion of the machine readable instructions represented by the flowcharts of FIGS. 8-10 may be executed by an ASIC. It should be understood that some or all of the circuitry of FIGS. 2, 3, and/or 4 may, thus, be instantiated at the same or different times. Some or all of the circuitry may be instantiated, for example, in one or more threads executing concurrently and/or in series. Moreover, in some examples, some or all of the circuitry of FIGS. 2, 3, and/or 4 may be implemented within one or more virtual machines and/or containers executing on the microprocessor.

In some examples, the processor circuitry 1112 of FIG. 11, the processor circuitry 1212 of FIG. 12, and/or the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1112 of FIG. 11, the processor circuitry 1212 of FIG. 12, and/or the processor circuitry 1312 of FIG. 13, which may be in one or more packages. For example, the XPU may include a CPU in one package, a DSP in another package, a GPU in yet another package, and an FPGA in still yet another package.

Figure 16:
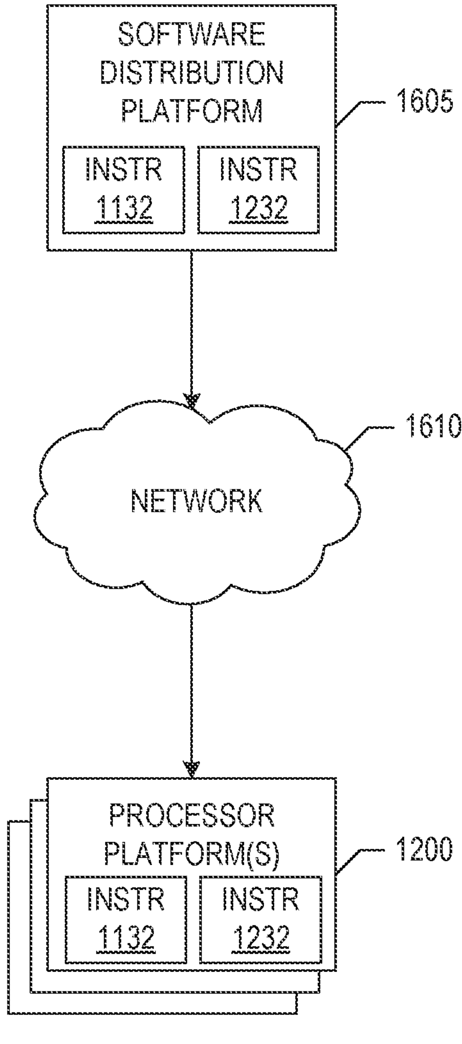
FIG. 16 is a block diagram of an example software distribution platform (e.g., one or more servers) to distribute software (e.g., software corresponding to the example machine readable instructions of FIG. 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1132 of FIG. 11 and/or the example machine readable instructions 1232 of FIG. 12 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the machine readable instructions 1132 of FIG. 11 and/or the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1132, which may correspond to the example machine readable instructions 800 of FIG. 8, as described above, and/or the machine readable instructions 1232, which may correspond to the example machine readable instructions 900 of FIG. 9, as described above. The one or more servers of the example software distribution platform 1605 are in communication with an example network 1610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132, 1232 from the software distribution platform 1605. For example, the software, which may correspond to the example machine readable instructions 800 of FIG. 8 and/or the example machine readable instructions 900 of FIG. 9, may be downloaded to the example processor platform 1200, which is to execute the machine readable instructions 1132, 1232 to implement the gaze management circuitry 102. In some examples, one or more servers of the software distribution platform 1605 periodically offer, transmit, and/or force updates to the software (e.g., the example machine readable instructions 1132 of FIG. 11, the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that evaluate eye gaze of a user in camera image streams and provide user feedback with respect to eye gaze behavior. Examples disclosed herein monitor durations and/or directions of eye gaze of the user during a video conference in which the user is interacting with one or more other participants. Some examples disclosed herein determine whether the duration of the eye gaze directed to, for instance, one or more participants in a video conference, satisfies an eye gaze time threshold. In response to the duration satisfying (e.g., exceeding) the eye gaze time threshold, examples disclosed herein cause an alert to be presented to the user via, for instance, an interface of the video conference. The alert can suggest or recommend that the user redirect his or her gaze away from a portion of the video conference interface and/or toward a different portion of the video conference interface (and, thus, in some examples, toward a different participant). Accordingly, examples disclosed herein guide the user to adjust his or her eye gaze to facilitate or improve a conversational experience for the participant(s) of the video conference.

Example systems, apparatus, articles of manufacture, and methods for eye gaze correction in camera image streams are disclosed herein. Further examples and combinations thereof include the following:

Example 1 includes an apparatus comprising timing circuitry to calculate a duration of time for which an eye gaze of a first user of a video conference is directed toward a second user of the video conference, the second user presented as an image via a video conference interface, the video conference interface presented by a display of an electronic device, and social feedback control circuitry to select an eye gaze time threshold based on content associated with the video conference interface, and in response to the duration of time satisfying the eye gaze time threshold, cause an alert to be presented on the display with the video conference interface.

Example 2 includes the apparatus of example 1, wherein the eye gaze is a corrected eye gaze associated with gaze corrected frames output for presentation to the second user.

Example 3 includes the apparatus of any of examples 1 or 2, further including gaze tracking circuitry to determine a direction of the eye gaze relative to a portion of the video conference interface, and cause the gaze corrected frames to be output for presentation to the second user based on the direction of the eye gaze relative to the portion of the video conference interface.

Example 4 includes the apparatus of any of examples 1-3, further including speaker identification circuitry to identify the second user or a third user as a speaker, the social feedback control circuitry to select the eye gaze time threshold based on the identified speaker.

Example 5 includes the apparatus of any of examples 1-4, further including pupil dilation monitoring circuitry to determine a pupil dilation rate of the second user, the social feedback control circuitry to select the eye gaze time threshold based on the pupil dilation rate.

Example 6 includes the apparatus of any of examples 1-5, wherein the social feedback control circuitry is to select the eye gaze time threshold based on a number of users in the video conference.

Example 7 includes the apparatus of any of examples 1-6, wherein the alert includes a bounding box around at least a portion of the image of the second user.

Example 8 includes the apparatus of any of examples 1-7, wherein the bounding box has a first color in response to the duration of time satisfying the eye gaze time threshold.

Example 9 includes the apparatus of any of examples 1-8, wherein the second user presented in the image is presented as an avatar in the image.

Example 10 includes a non-transitory machine readable storage medium comprising instructions that, when executed, cause processor circuitry to at least determine a direction of an eye gaze of a first participant of a video conference relative to a video conference interface presented on a display of a first electronic device, cause a first gaze corrected frame to be output for transmission to a second electronic device associated with a second participant of the video conference based on the direction of the eye gaze, the video conference interface including an image of the second participant, the first gaze corrected frame including a corrected eye gaze for the first participant, monitor a duration of time for which the corrected eye gaze is associated with the second participant, and cause an alert to be output at the first electronic device when the duration of time exceeds an eye gaze threshold.

Example 11 includes the non-transitory machine readable storage medium of example 10, wherein the instructions, when executed, cause the processor circuitry to identify one of the second participant or a third participant of the video conference as a speaker, assign a first value to the eye gaze threshold when the second participant is identified as the speaker, and assign a second value to the eye gaze threshold when the third participant is identified as the speaker, the second value different than the first value.

Example 12 includes the non-transitory machine readable storage medium of any of examples 10 or 11, wherein the instructions, when executed, cause the processor circuitry to determine a pupil dilation rate of the second participant based on image data of the second participant, the image data associated with the video conference interface, and select the eye gaze threshold based on the pupil dilation rate.

Example 13 includes the non-transitory machine readable storage medium of any of examples 10-12, wherein the instructions, when executed, cause the processor circuitry to detect an eye gaze of a third participant of the video conference relative to the first participant based on image data of the third participant, the image data associated with the video conference interface, and cause the alert to be output at the first electronic device based on the eye gaze of the third participant.

Example 14 includes the non-transitory machine readable storage medium of any of examples 10-13, wherein the instructions, when executed, cause the processor circuitry to detect a change in the direction of the eye gaze of the first participant relative to the video conference interface, and cause a second gaze corrected frame to be output for transmission to a third electronic device associated with a third participant of the video conference based on the change in the direction of the eye gaze, the video conference interface including an image of the third participant.

Example 15 includes the non-transitory machine readable storage medium of any of examples 10-14, wherein the video conference includes a plurality of participants and the instructions, when executed, cause the processor circuitry to cause the second gaze corrected frame to be output for transmission to respective electronic devices associated with each participant of the video conference based on the change in the direction of the eye gaze.

Example 16 includes the non-transitory machine readable storage medium of any of examples 10-15, wherein the alert includes an audio alert or a visual alert presented via the display.

Example 17 includes the non-transitory machine readable storage medium of any of examples 10-16, wherein the visual alert includes a bounding box around at least a portion of the image of the second participant.

Example 18 includes the non-transitory machine readable storage medium of any of examples 10-17, wherein the image of the second participant includes an avatar representing the second participant.

Example 19 includes an apparatus comprising at least one memory, machine readable instructions, and processor circuitry to at least one of instantiate or execute the machine readable instructions to output an indicator of a direction of an eye gaze of a first participant of a video conference relative to content presented via a video conference interface, the indicator to be presented with the video conference interface on a display of an electronic device, and adjust a property of the indicator based on a change associated with one or more of content of the video conference interface or the direction of the eye gaze of the first participant relative to the content.

Example 20 includes the apparatus of example 19, wherein the processor circuitry is to identify a second participant of the video conference as a speaker, and adjust the property of the indicator in response to identifying the second participant as the speaker.

Example 21 includes the apparatus of any of examples 19 or 20, wherein the processor circuitry is to determine a pupil dilation rate for a second participant of the video conference, the video conference interface including an image of the second participant, and adjust the property of the indicator based on the pupil dilation rate.

Example 22 includes the apparatus of any of examples 19-21, wherein the property includes a color of the indicator.

Example 23 includes the apparatus of any of examples 19-22, wherein the processor circuitry is to adjust the property of the indicator when a duration of time of the eye gaze exceeds an eye gaze threshold for maintaining the direction of the eye gaze of the first participant relative to the content.

Example 24 includes the apparatus of any of examples 19-23, wherein the content is associated with one or more other participants of the video conference.

Example 25 includes the apparatus of any of examples 19-24, wherein the content of the video conference interface includes an avatar representing a second participant of the video conference.

Example 26 includes an apparatus comprising means for timing to calculate a duration of time for which an eye gaze of a first user of a video conference is directed toward a second user of the video conference, the second user presented as an image via a video conference interface, the video conference interface presented by a display of an electronic device, and means for providing social feedback to select an eye gaze time threshold based on content associated with the video conference interface, and in response to the duration of time satisfying the eye gaze time threshold, cause an alert to be presented on the display with the video conference interface.

Example 27 includes the apparatus of example 26, wherein the eye gaze is a corrected eye gaze associated with gaze corrected frames output for presentation to the second user.

Example 28 includes the apparatus of any of examples 26 or 27, further including means for tracking to determine a direction of the eye gaze relative to a portion of the video conference interface, and cause the gaze corrected frames to be output for presentation to the second user based on the direction of the eye gaze relative to the portion of the video conference interface.

Example 29 includes the apparatus of any of examples 26-28, further including means for identifying speakers to identify the second user or a third user as a speaker, the means for providing social feedback to select the eye gaze time threshold based on the identified speaker.

Example 30 includes the apparatus of any of examples 26-29, further including means for monitoring pupil dilation to determine a pupil dilation rate of the second user, the means for providing social feedback to select the eye gaze time threshold based on the pupil dilation rate.

Example 31 includes the apparatus of any of examples 26-30, wherein the means for providing social feedback is to select the eye gaze time threshold based on a number of users in the video conference.

Example 32 includes the apparatus of any of examples 26-31, wherein the alert includes a bounding box around at least a portion of the image of the second user.

Example 33 includes the apparatus of any of examples 26-32, wherein the bounding box has a first color in response to the duration of time satisfying the eye gaze time threshold.

Example 34 includes the apparatus of any of examples 26-33, wherein the second user presented in the image as an avatar.

Example 35 includes a method comprising determining a direction of an eye gaze of a first participant of a video conference relative to a video conference interface presented on a display of a first electronic device, causing a first gaze corrected frame to be output for transmission to a second electronic device associated with a second participant of the video conference based on the direction of the eye gaze, the video conference interface including an image of the second participant, the first gaze corrected frame including a corrected eye gaze for the first participant, monitoring a duration of time for which the corrected eye gaze is associated with the second participant, and causing an alert to be output at the first electronic device when the duration of time exceeds an eye gaze threshold.

Example 36 includes the method of example 35, further including identifying one of the second participant or a third participant of the video conference as a speaker, assigning a first value to the eye gaze threshold when the second participant is identified as the speaker, and assigning a second value to the eye gaze threshold when the third participant is identified as the speaker, the second value different than the first value.

Example 37 includes the method of any of examples 35 or 36, further including determining a pupil dilation rate of the second participant based on image data of the second participant, the image data associated with the video conference interface, and selecting the eye gaze threshold based on the pupil dilation rate.

Example 38 includes the method of any of examples 35-37, further including detecting an eye gaze of a third participant of the video conference relative to the first participant based on image data of the third participant, the image data associated with the video conference interface, and causing the alert to be output at the first electronic device based on the eye gaze of the third participant.

Example 39 includes the method of any of examples 35-38, further including detecting a change in the direction of the eye gaze of the first participant relative to the video conference interface, and causing a second gaze corrected frame to be output for transmission to a third electronic device associated with a third participant of the video conference based on the change in the direction of the eye gaze, the video conference interface including an image of the third participant.

Example 40 includes the method of any of examples 35-39, wherein the video conference includes a plurality of participants, further including causing the second gaze corrected frame to be output for transmission to respective electronic devices associated with each participant of the video conference based on the change in the direction of the eye gaze.

Example 41 includes the method of any of examples 35-40, wherein the alert includes an audio alert or a visual alert presented via the display.

Example 42 includes the method of any of examples 35-41, wherein the visual alert includes a bounding box around at least a portion of the image of the second participant.

Example 43 includes an apparatus comprising interface circuitry to obtain image data associated with a video conference, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate timing circuitry to calculate a duration of time for which an eye gaze of a first user of the video conference is directed toward a second user of the video conference, the second user presented as an image via a video conference interface, the video conference interface presented by a display of an electronic device, and social feedback control circuitry to select an eye gaze time threshold based on content associated with the video conference interface, and in response to the duration of time satisfying the eye gaze time threshold, cause an alert to be presented on the display with the video conference interface.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

machine readable instructions; and at least one programmable circuit to instantiate:

timing circuitry to calculate a duration of time for which an eye gaze of a first user of a video conference is directed toward a second user of the video conference, the second user presented as an image via a video conference interface, the video conference interface presented by a display of an electronic device;

pupil dilation monitoring circuitry to determine a pupil dilation rate of the second user; and social feedback control circuitry to:

select an eye gaze time threshold based on the pupil dilation rate and content associated with the video conference interface; and in response to the duration of time satisfying the eye gaze time threshold, cause an alert to be presented on the display with the video conference interface.

2. The apparatus of claim 1, wherein the eye gaze is a corrected eye gaze associated with gaze corrected frames output for presentation to the second user.

3. The apparatus of claim 2, wherein one or more of the at least one programmable circuit is to instantiate gaze tracking circuitry to:

determine a direction of the eye gaze relative to a portion of the video conference interface; and cause the gaze corrected frames to be output for presentation to the second user based on the direction of the eye gaze relative to the portion of the video conference interface.

4. The apparatus of claim 1, wherein one or more of the at least one programmable circuit is to instantiate speaker identification circuitry to identify the second user or a third user as a speaker, the social feedback control circuitry to select the eye gaze time threshold based on the identified speaker.

5. The apparatus of claim 1, wherein the social feedback control circuitry is to select the eye gaze time threshold based on a number of users in the video conference.

6. The apparatus of claim 1, wherein the alert includes a bounding box around at least a portion of the image of the second user.

7. The apparatus of claim 1, wherein the second user presented in the image is presented as an avatar in the image.

8. A non-transitory machine readable storage medium comprising instructions to cause at least one programmable circuit to at least:

determine a direction of an eye gaze of a first participant of a video conference relative to a video conference interface presented on a display of a first electronic device;

cause a first gaze corrected frame to be output for transmission to a second electronic device associated with a second participant of the video conference based on the direction of the eye gaze, the video conference interface including an image of the second participant, the first gaze corrected frame including a corrected eye gaze for the first participant;

determine a pupil dilation rate of the second participant based on image data of the second participant, the image data associated with the video conference interface;

select an eye gaze threshold based on the pupil dilation rate;

monitor a duration of time for which the corrected eye gaze is associated with the second participant; and cause an alert to be output at the first electronic device when the duration of time exceeds the eye gaze threshold.

9. The non-transitory machine readable storage medium of claim 8, wherein the instructions are to cause one or more of the at least one programmable circuit to:

identify one of the second participant or a third participant of the video conference as a speaker;

assign a first value to the eye gaze threshold when the second participant is identified as the speaker; and assign a second value to the eye gaze threshold when the third participant is identified as the speaker, the second value different than the first value.

10. The non-transitory machine readable storage medium of claim 8, wherein the alert is a first alert, the image data is first image data and the instructions are to cause one or more of the at least one programmable circuit to:

detect an eye gaze of a third participant of the video conference relative to the first participant based on second image data of the third participant, the second image data associated with the video conference interface; and cause a second alert to be output at the first electronic device based on the eye gaze of the third participant.

11. The non-transitory machine readable storage medium of claim 8, wherein the instructions are to cause one or more of the at least one programmable circuit to:

detect a change in the direction of the eye gaze of the first participant relative to the video conference interface; and cause a second gaze corrected frame to be output for transmission to a third electronic device associated with a third participant of the video conference based on the change in the direction of the eye gaze, the video conference interface including an image of the third participant.

12. The non-transitory machine readable storage medium of claim 11, wherein the video conference includes a plurality of participants and the instructions are to cause one or more of the at least one programmable circuit to cause the second gaze corrected frame to be output for transmission to respective electronic devices associated with each participant of the video conference based on the change in the direction of the eye gaze.

13. The non-transitory machine readable storage medium of claim 8, wherein the alert includes an audio alert or a visual alert presented via the display.

14. An apparatus comprising:

at least one memory;

machine readable instructions; and at least one programmable circuit to at least one of instantiate or execute the machine readable instructions to:

output an indicator of a direction of an eye gaze of a first participant of a video conference relative to content presented via a video conference interface, the indicator to be presented with the video conference interface on a display of an electronic device;

determine a pupil dilation rate for a second participant of the video conference, the video conference interface including an image of the second participant; and adjust a property of the indicator based on the pupil dilation rate and a change associated with one or more of content of the video conference interface or the direction of the eye gaze of the first participant relative to the content.

15. The apparatus of claim 14, wherein one or more of the at least one programmable circuit is to:

identify the second participant of the video conference as a speaker; and adjust the property of the indicator in response to identifying the second participant as the speaker.

16. The apparatus of claim 14, wherein one or more of the at least one programmable circuit is to adjust the property of the indicator when a duration of time of the eye gaze exceeds an eye gaze threshold for maintaining the direction of the eye gaze of the first participant relative to the content.

17. The apparatus of claim 14, wherein the content of the video conference interface includes an avatar representing the second participant of the video conference.

* * * * *